United States Patent
Honjo et al.

[11] Patent Number: 5,119,145
[45] Date of Patent: Jun. 2, 1992

[54] ORIGINAL HANDLING APPARATUS IN WHICH THE EXCHANGE TIME OF ORIGINALS IS SHORTENED

[75] Inventors: Takeshi Honjo, Kawasaki; Akimaro Yoshida, Tokyo; Makoto Kitahara, Tokyo; Norifumi Miyake, Tokyo, all of Japan

[73] Assignee: Canon Kabushiki Kaisha, Tokyo, Japan

[21] Appl. No.: 523,278

[22] Filed: May 15, 1990

Related U.S. Application Data

[63] Continuation of Ser. No. 321,838, Mar. 10, 1989, abandoned.

[30] Foreign Application Priority Data

Mar. 14, 1988 [JP] Japan .................. 63-60107
Mar. 14, 1988 [JP] Japan .................. 63-60108
Mar. 14, 1988 [JP] Japan .................. 63-60109
May 16, 1988 [JP] Japan .................. 63-118591
May 16, 1988 [JP] Japan .................. 63-118592

[51] Int. Cl.⁵ .................. G03G 21/00; B65H 7/02
[52] U.S. Cl. .................. 355/308; 271/259; 271/265; 355/311
[58] Field of Search .......... 355/308, 309, 320, 25, 355/311; 271/3.1, 111, 259, 265

[56] References Cited

U.S. PATENT DOCUMENTS

| | | | |
|---|---|---|---|
| 4,264,187 | 4/1981 | Rhodes | 355/316 X |
| 4,391,504 | 7/1983 | Acquaviva | 355/308 |
| 4,615,610 | 10/1986 | Yoshiura | 355/210 |
| 4,716,439 | 12/1987 | Acquaviva | 355/218 |
| 4,727,402 | 2/1988 | Smith | 355/321 X |
| 4,731,637 | 3/1988 | Acquaviva et al. | 355/317 |
| 4,771,319 | 9/1988 | Hamakawa | 355/319 |
| 4,791,451 | 12/1988 | Hirose et al. | 271/227 X |
| 4,825,248 | 4/1989 | Honjo et al. | 355/316 X |
| 4,996,568 | 2/1991 | Hamakawa | 355/308 |

FOREIGN PATENT DOCUMENTS

| | | |
|---|---|---|
| 263398 | 4/1988 | European Pat. Off. |
| 58-88767 | 5/1983 | Japan |
| 60-26332 | 2/1985 | Japan |
| 60-140364 | 7/1985 | Japan |
| 61-32836 | 2/1986 | Japan |

*Primary Examiner*—Fred L. Braun
*Attorney, Agent, or Firm*—Fitzpatrick, Cella, Harper & Scinto

[57] ABSTRACT

An original handling apparatus is provided with a conveyor, a setting circuit and a control system. The conveyor conveys an original in plural modes in which an original is scanned. The conveyor is operated in a first convey mode in which an original is fed to and stopped at a first position on a platen. After the scan is completed, the scanned original is fed to and stopped at a second position on the platen, and a next original is fed to and stopped at the first position on the platen. In the second convey mode, the original is fed to and stopped at the first position on the platen, and after scan is completed, the original is discharged from the first position. A next original is then fed to and stopped at the first position on the platen. The setting circuit sets either the first or second convey modes. The setting circuit enables the first convey mode to be set in a single-side mode wherein only one side of the original is scanned, and prohibits the first convey mode from being set in a dual-side mode wherein both sides of an original are scanned. A controller controls the conveyor to be operated in either the first or second convey mode in accordance with a setting signal from the setting circuit.

14 Claims, 28 Drawing Sheets

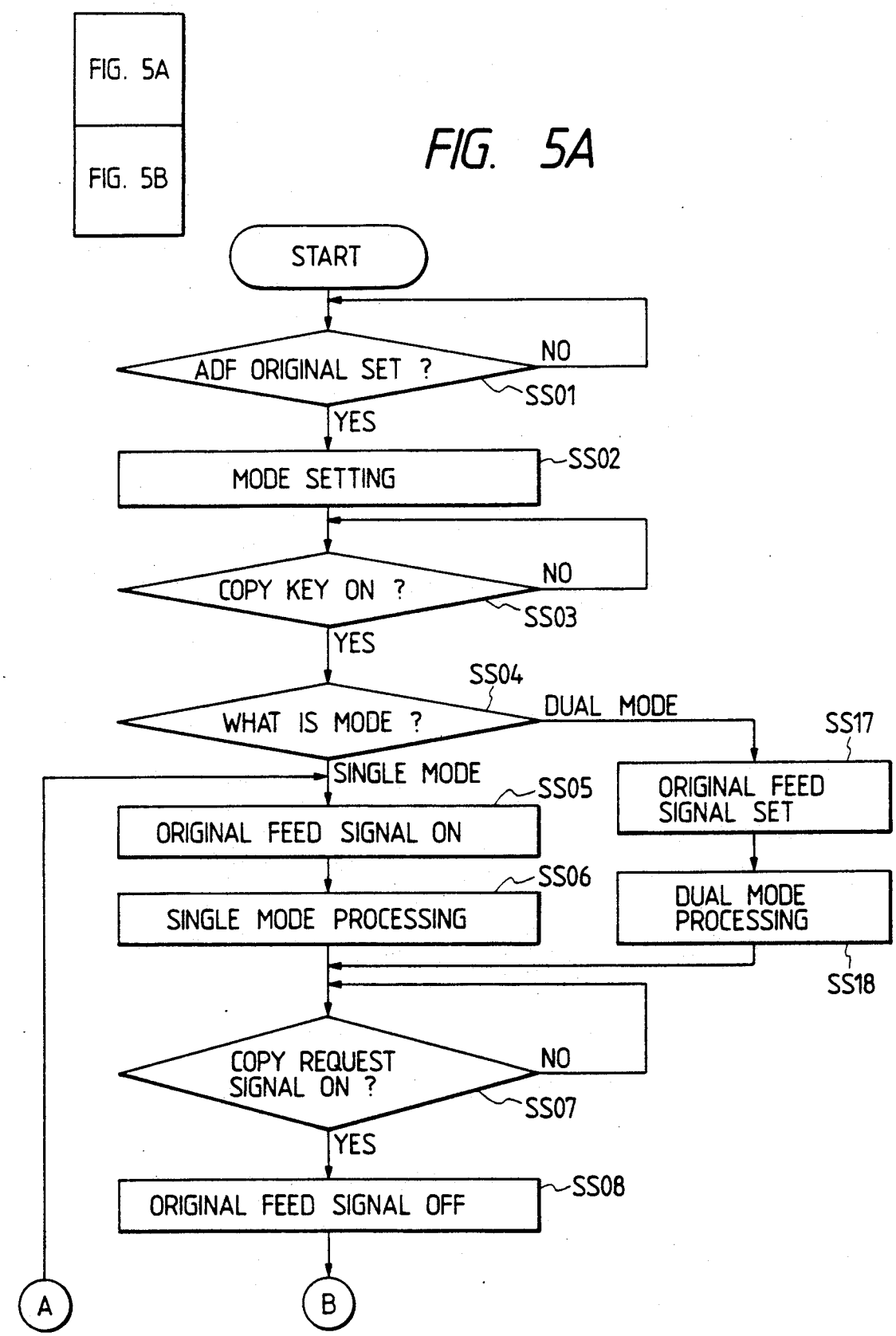

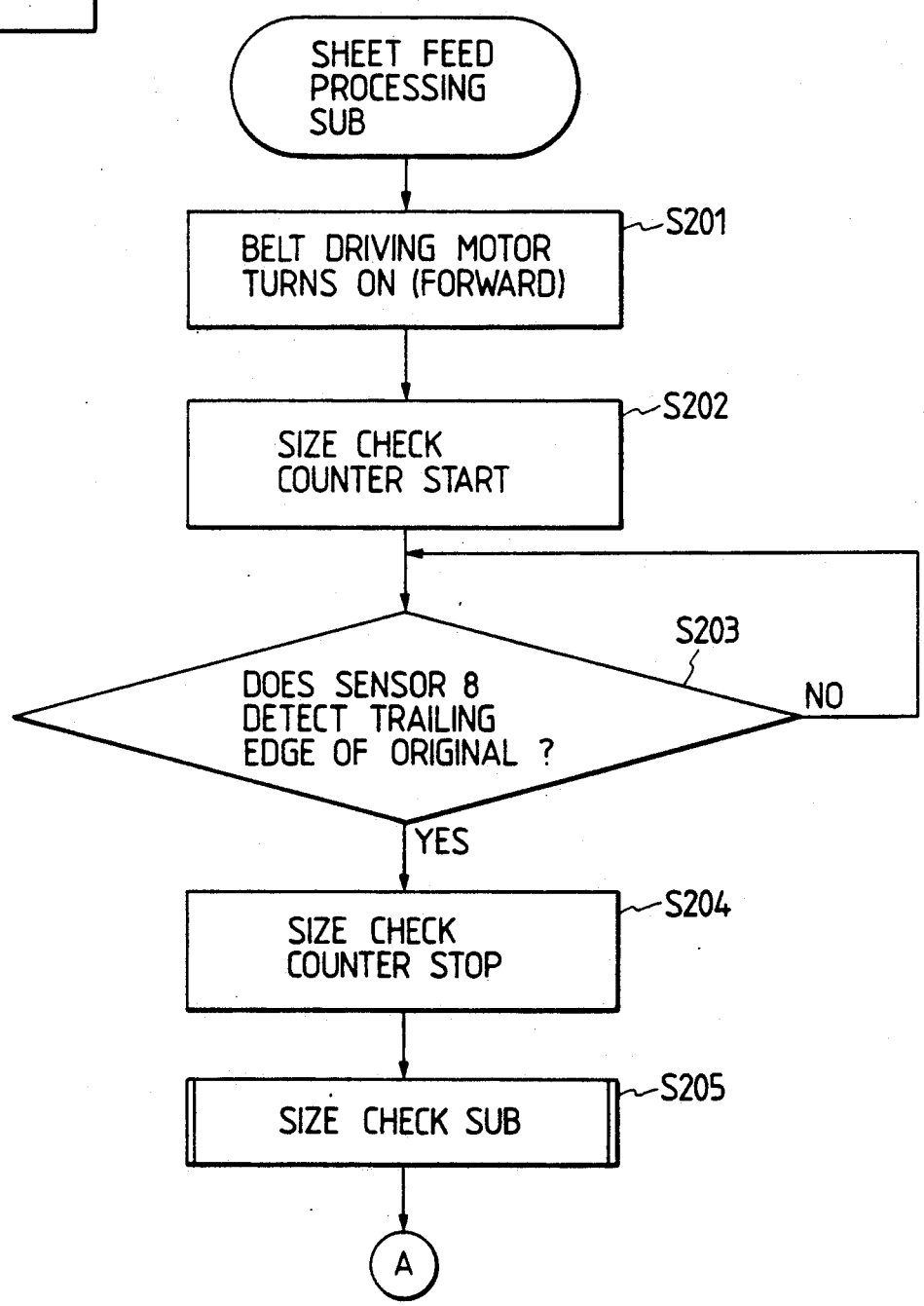

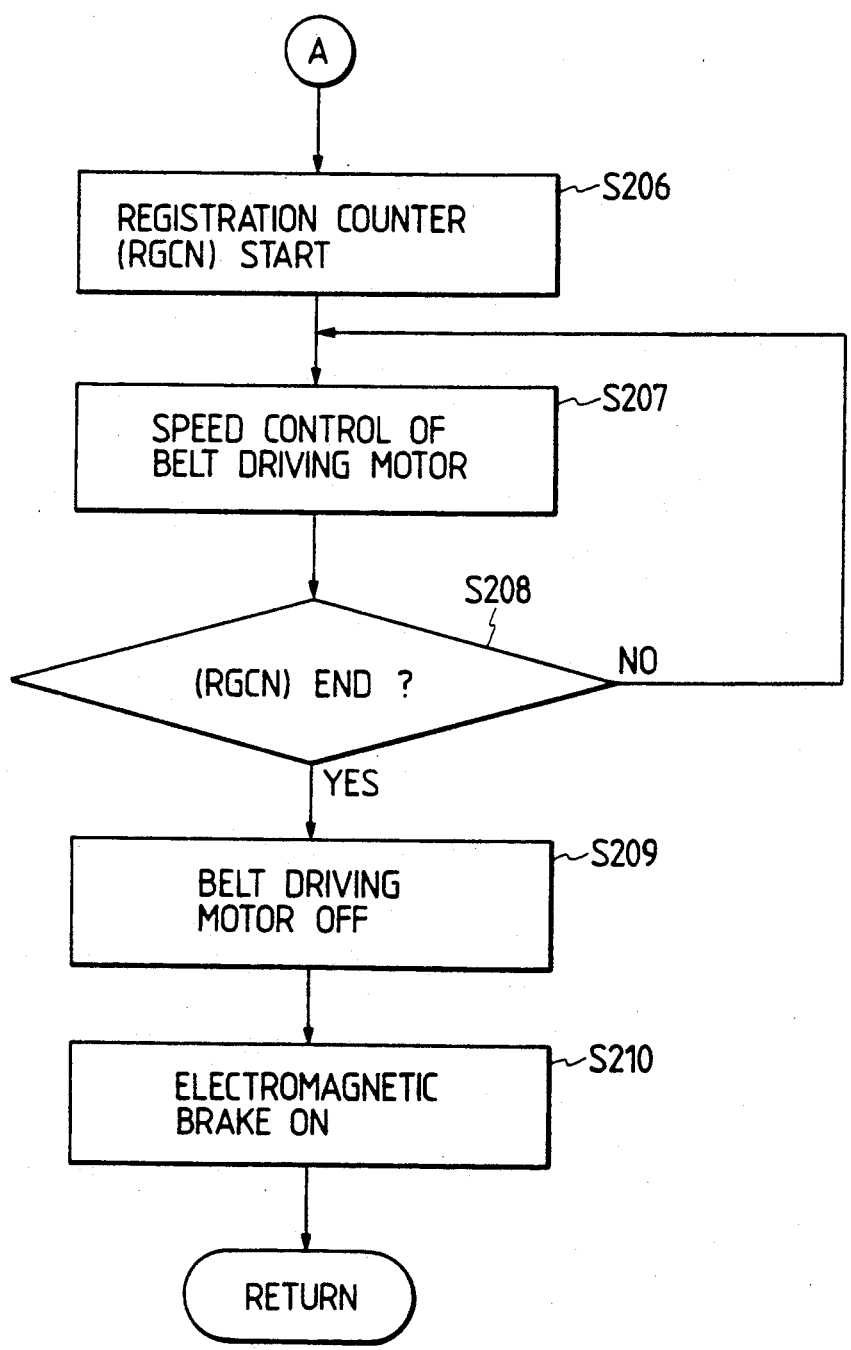

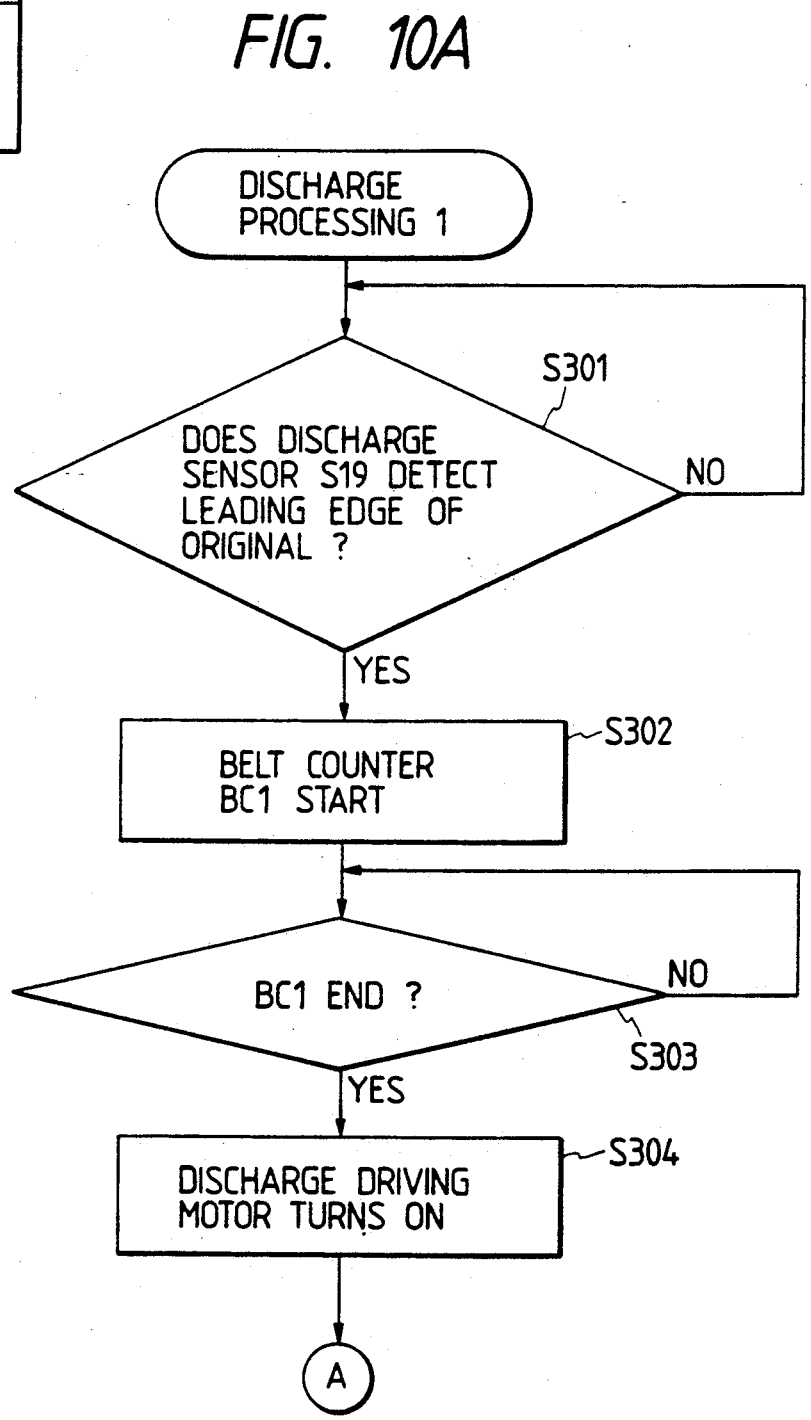

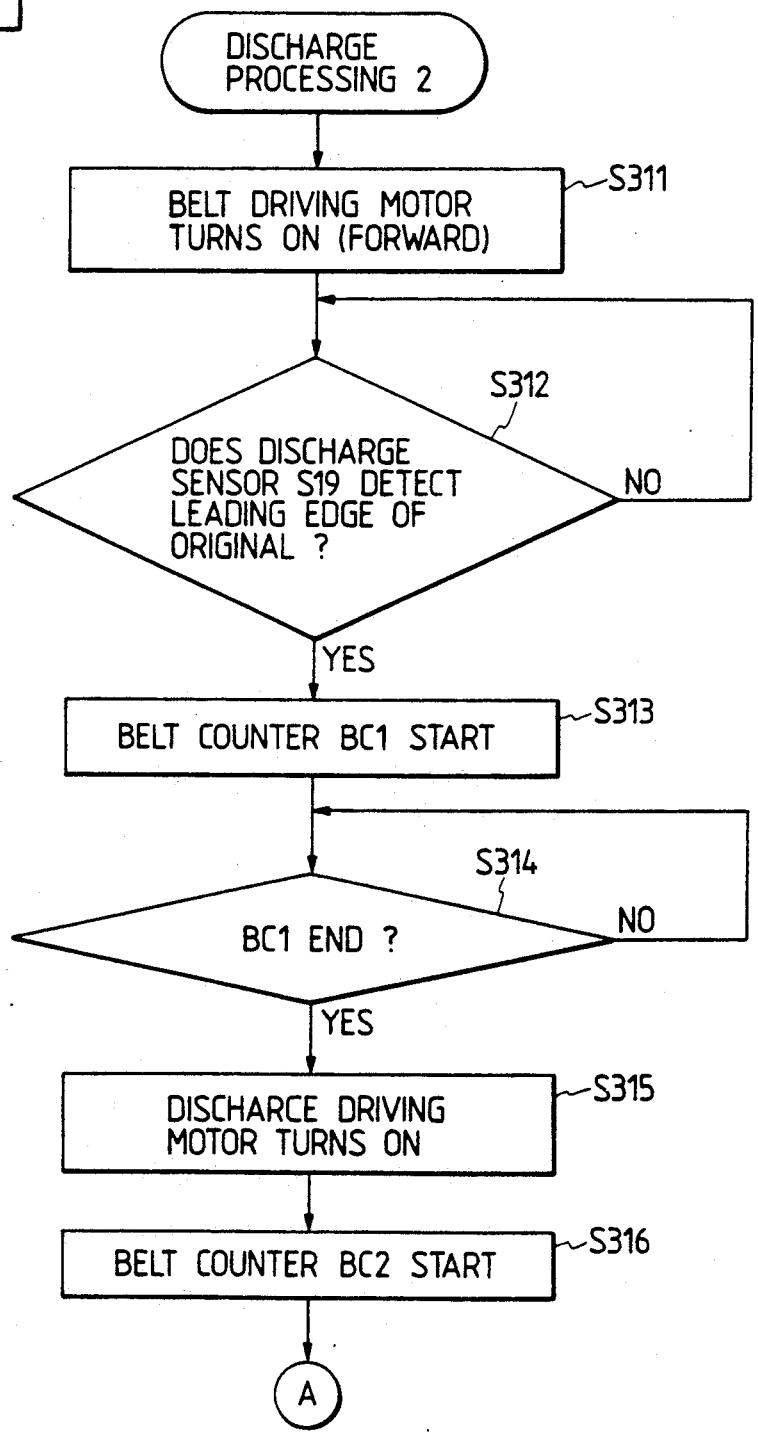

SINGLE SIDE ORIGINAL

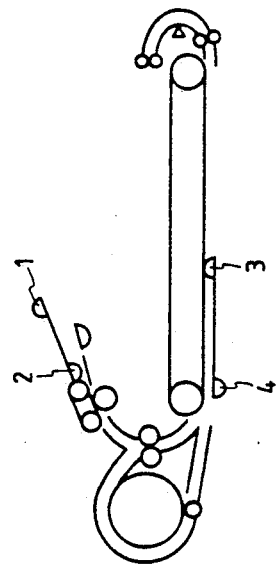 FIG. 14A 2 DUAL SIDE ORIGINAL

ORIGINAL HANDLING APPARATUS IN WHICH THE EXCHANGE TIME OF ORIGINALS IS SHORTENED

This application is a continuation of application Ser. No. 321,838 filed Mar. 10, 1989, now abandoned.

BACKGROUND OF THE INVENTION

The present invention relates to an original handling apparatus for automatically feeding an original to an original reading position.

In a conventional image forming apparatus such as a copying machine, an original conveying apparatus for automatically feeding an original to an exposure position and discharging the original after an exposure operation is often additionally used.

However, in the conventional original conveying apparatus, the following original conveying method is employed regardless of the size of an original. In this method, an original is fed to and stopped at a copying position on a platen glass one by one, the original for which copying exposure is completed is discharged from the platen glass, and at the same time, the next original is fed to and stopped at an image reading position to perform copying exposure. Such a procedure is repetitively performed. In this original conveying method, as the size of an original becomes smaller, an interval between two adjacent originals is increased, thus wasting conveyance time. This results in a decrease in copying speed.

If conveyance speed is increased more than a required level in order to solve the above problem, noise, wear of a conveyor belt, or the like becomes noticeable, and a damage to an original when a convey error occurs is also increased, resulting in a serious problem.

As inventions which can solve the above-mentioned drawback to some extent, original feeding methods of copying machines disclosed in, e.g., Japanese Patent Laid-Open (Kokai) Nos. 60-140364 and 61-32836 are known.

The original feeding method described in Japanese Patent Laid-Open (Kokai) No. 60-140364 is as follows. More specifically, when originals having a smaller size than a copying size are continuously copied, a first original placed on an original tray arranged at a side opposite to a platen glass (upstream side in an original conveying direction) is conveyed to a copying position (image reading position) set at a downstream position on the platen glass surface of a copying machine, and is stopped at that position while abutting against a stopper. Subsequently, a second original is conveyed to a standby position set at an upstream position on the platen glass surface adjacent to the copying position, and is stopped at that position while abutting against a stopper. The first original subjected to exposure is discharged in a downstream direction of the platen glass surface. In synchronism with this operation, the second original at the standby position is conveyed to the copying position, and a third original placed on the original tray is conveyed to and stopped at the standby position. Thus, such a procedure is repeated.

However, in the conventional original feeding method, since an original is stopped at the standby position by a mechanical stopper, A4-size originals (half a maximum size A3) can be efficiently conveyed. However, originals having a small size such as a B5 size or post-card size can only be held at a predetermined position of the stopper. Therefore, an interval between a reading original and the next original is increased more than required, thus impairing copying efficiency. In addition, in the conventional original feeding method, since the copying position on the platen glass is located at a position opposite to the original tray, conveyance time to the copying position of the first original requires a maximum conveyance time for a maximum size A3 original even if A4-size originals half the maximum size A3 are to be fed, resulting in poor work efficiency.

In contrast to this, the original feeding method described in Japanese Patent Laid-Open (Kokai) No 61-32836 is as follows. A distance slightly larger than a length of each of originals to be sequentially conveyed in a conveying direction is detected, and a conveyance time period required for moving a conveyor belt by the detected distance is set. A first original placed on an original tray is conveyed to and stopped at a copying position (image reading position) preset at a downstream position in the original conveying direction on a platen glass by a sheet feed roller and the conveyor belt. Subsequently, a second original is conveyed to and stopped at a standby position at an upstream position on the platen glass adjacent to the copying position with an appropriate interval by the sheet feed roller and the conveyor belt. Then, the first original subjected to exposure is discharged in a downstream direction of the platen glass surface. In synchronism with this operation, the second original at the standby position is conveyed to the copying position, and a third original placed on the original tray is conveyed to and stopped at the standby position by moving the conveyor belt by the corresponding convey time period. Thus, such a procedure is repeated. In this prior art, a positioning means for stopping an original at respective positions is realized not by a mechanical stopper but by stop position control of the conveyor belt. Since an interval between the reading original and the next original can be made constant regardless of the original size, the problem of a decrease in copying efficiency caused by the original size can be eliminated.

However, in the latter conventional method, for the second and subsequent originals, a procedure of conveying an original by a predetermined conveyance time period and stopping it at the standby position must be performed at least once. For this reason, as the number of times of repetition of conveying and stopping is increased, even if stop position control of the conveyor belt can be smoothly performed, an offset caused by slipping between the belt and the original tends to occur. Finally, the original is offset from a predetermined copying position when it reaches this position. As a result, stop precision as an important function of this original conveying apparatus is impaired.

Furthermore, in the latter conventional method, the problem of a decrease in copying efficiency caused by an original size difference can be eliminated, but it is difficult to control an original interval. More specifically, when the first original is conveyed and its trailing edge leaves an original tray unit, the second original is fed from the original tray. If the rotational speed of the sheet feed roller for feeding an original from the original tray is too fast, a feeding error such as skewing of an original tends to occur. For this reason, it is difficult to match the rotational speed of the sheet feed roller with the speed of the conveyor belt, and the rotational speed of the roller must be set to be lower than the speed of the conveyor belt. Therefore, an original interval is increased more than required, and becomes uniform regardless of an original size. However, this results in a poor copying efficiency.

The conventional method has no switching means for switching a normal mode for feeding originals one by one and the above-mentioned multi-feed mode. Therefore, when two originals (e.g., two A4-size originals) are placed on the platen glass, if image reading is executed for a maximum size (e.g., A3 size), an image on an original other than one for which image reading and image formation are to be performed is read. When the image is copied, an unnecessary image is copied.

In the conventional method, original interval control for performing an exposed original discharging operation and a sheet feeding operation of an original at the standby position by a single drive operation must also be performed. This control is complex, and it is difficult to shorten an original feed interval, resulting in poor efficiency.

Since an original before exposure is located at the downstream position on the platen glass on which an original which is being exposed is also present, a distance between originals cannot be shortened after an exposure operation is started. Therefore, the distance between the originals must be adjusted before the original is conveyed to the exposure position, thus causing loss time and difficulty in control. In order to shorten the distance between originals, the arrangement of drive units becomes complicated, and an original convey path also becomes complicated. In a worst case, an original may be damaged.

SUMMARY OF THE INVENTION

The present invention has been made in consideration of the above situation, and has as its object to provide an improved original handling apparatus.

It is another object of the present invention to provide an original handling apparatus which can shorten an exchange time of originals.

It is still another object of the present invention to provide an original handling apparatus which can prevent reading of an unnecessary original.

It is still another object of the present invention to provide an original handling apparatus which can efficiently perform original convey control without increasing a convey speed of an original.

It is still another object of the present invention to provide an original handling apparatus wherein a first original is conveyed to and stopped at a predetermined image reading position (first position) on a platen, a second original is subsequently conveyed to a standby position (second position) corresponding to an upstream position not on a platen but adjacent to the predetermined image reading position, the first original subjected to reading processing is conveyed to a downstream position (third position) capable of conveyance and adjacent to the predetermined image reading position on the platen, the second original is conveyed to and stopped at the predetermined image reading position, and the above-mentioned procedure is repeated for third and subsequent originals, so that a loss in exchange time of originals is not influenced by an original size and is minimized.

It is still another object of the present invention to provide an original handling apparatus which feeds an original to a reading position on a platen, transfers the original to a downstream position on the platen adjacent to the reading position after exposure, feeds a next original to the reading position, and appropriately controls an original exposure scanning range.

It is still another object of the present invention to provide an original handling apparatus which has a plurality of original convey modes, and selects one of the modes in accordance with a signal from a main body.

It is still another object of the present invention to provide an original handling apparatus which can feed an original located at a downstream position on the platen adjacent to the reading position independently of original feed control to the reading position.

The above and other objects and features of the present invention will be apparent from the following description taken in conjunction with the accompanying drawings.

BRIEF DESCRIPTION OF THE DRAWINGS

FIG. 6-1, consisting of FIGS. 6-1A and 6-1B, is a flow chart showing a control sequence in a single mode in the embodiment of the present invention;

FIG. 6-2, consisting of FIGS. 6-2A and 6-2B, is a flow chart showing a control sequence in a dual mode in the embodiment of the present invention;

FIGS. 7 to 12 are flow charts showing subroutines in the control sequences shown in FIGS. 6-1 and 6-2;

FIG. 8, consisting of FIGS. 8A and 8B, is a flow chart of the Sheet Feed Processing Subroutine;

FIG. 10, consisting of FIGS. 10A and 10B, is a flow chart of the Discharge Processing 1 Subroutine;

FIG. 11, consisting of FIGS. 11A and 11B, is a flow chart of the Discharge Processing 2 Subroutine;

FIGS. 14A to 14F are views showing a conveyance state and the positional relationship of an original in the dual mode in the embodiment of the present invention;

DETAILED DESCRIPTION OF THE PREFERRED EMBODIMENTS

An embodiment of the present invention will now be described with reference to the accompanying drawings.

Figure 1:
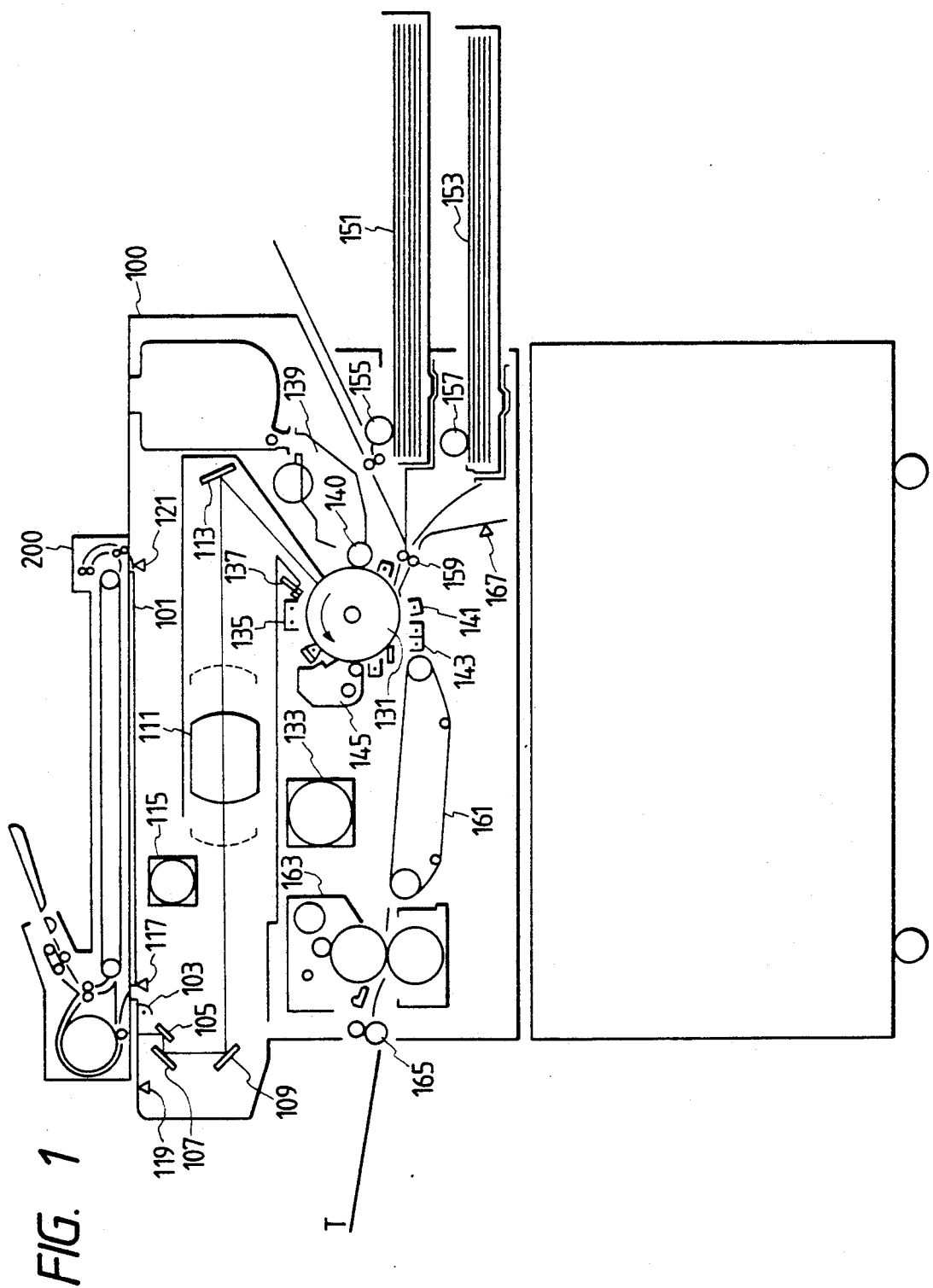
FIG. 1 is a schematic sectional view showing the overall arrangement of an image forming apparatus to which the present invention is applied.
Figure 2:
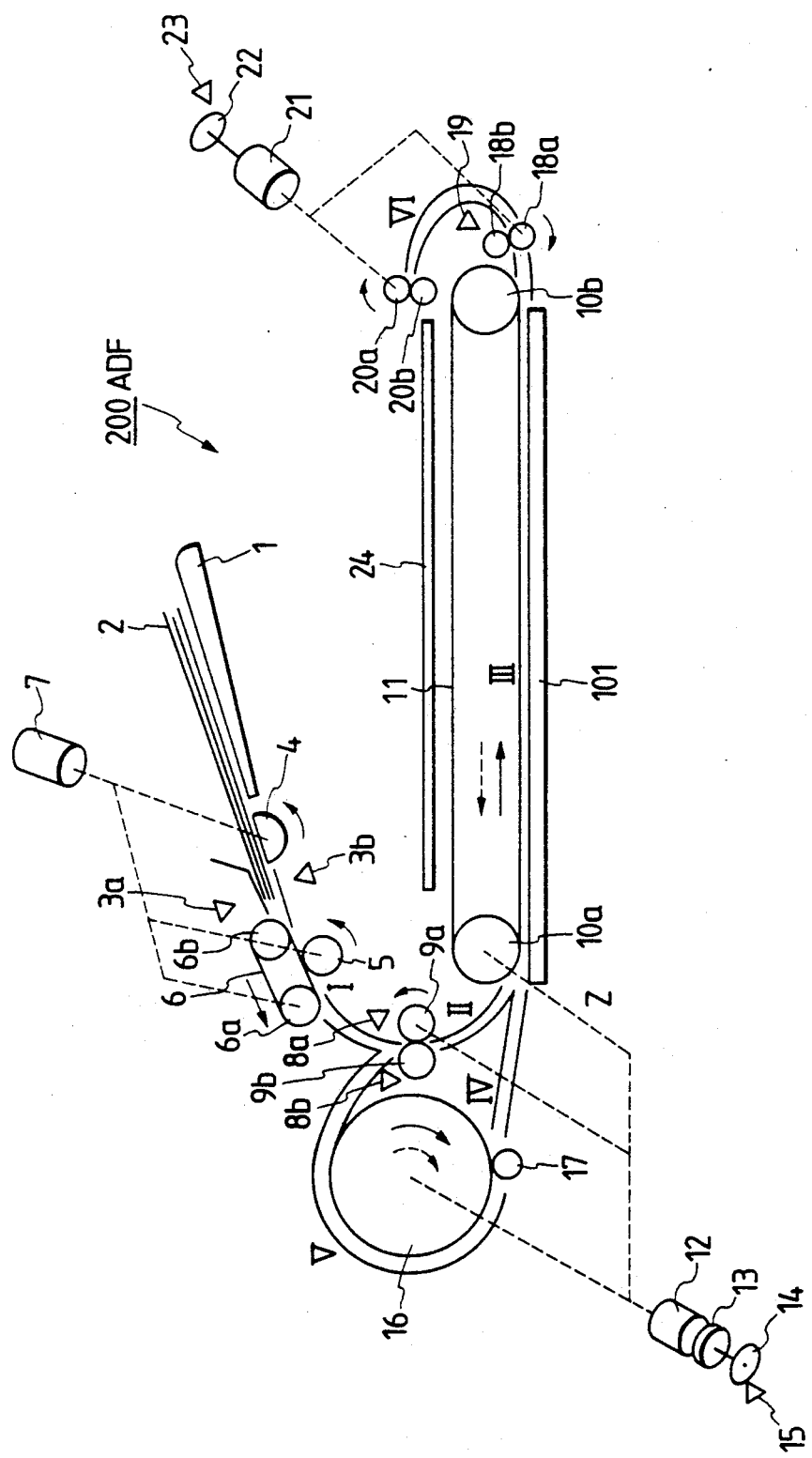
FIG. 2 is a view showing an arrangement of an original feeder in an embodiment shown in FIG. 1.

FIGS. 1 and 2 show an internal structure of an embodiment of an image recording apparatus (copying machine) to which the present invention is applied. The apparatus shown in FIG. 1 includes a copying machine main body 100 having both an image reading function and an image recording function, and an original feeder (to be referred to as an ADF hereinafter) 200 for automatically feeding an original.

A Copying Machine Main Body (100)

The main body 100 comprises an original glass table (platen glass) 101 for placing originals thereon, an illumination lamp (exposure lamp) 103 for illuminating an original, scanning reflection mirrors (scanning mirrors) 105, 107, and 109 for changing an optical path of a beam reflected by an original, a lens 111 having focusing and variable magnification functions, a fourth reflection mirror (scanning mirror) 113 for changing the optical path, an optical system motor 115 for driving an optical system, and sensors 117, 119, and 121 for detecting the positions of the optical system components.

The main body 100 has a photosensitive drum 131. A main motor 133 for driving the photosensitive drum 131, a high-voltage unit 135, a blank exposure unit 137, a developing device 139, a transfer charger 141, a separation charger 143, and a cleaning device 145 are arranged around the photosensitive drum 131.

The main body 100 also includes upper and lower cassettes 151 and 153, sheet feed rollers 155 and 157, registration rollers 159, a conveyor belt 161 for conveying a recording sheet on which an image is recorded toward a fixing device, a fixing device 163 for fixing the conveyed recording sheet by thermal compression, and a sensor 167 used during dual mode recording.

The surface of the photosensitive drum 131 is formed of a seamless photosensitive body using a photoconductor and a conductor. The drum 131 is pivotally and axially supported, and begins to rotate in a direction of an arrow in FIG. 1 by the main motor 133 which is operated in response to a depression of a copy start key (to be described later). When predetermined rotational control and potential control (pre-processing) of the drum 131 are completed, an original placed on the original glass table 101 is illuminated by the illumination lamp 103 which is arranged integrally with the first scanning mirror 105. Light reflected by the original is focused on the drum 131 through the first to third scanning mirrors 105, 107, and 109, the lens 111, and the fourth scanning mirror 113.

The drum 131 is corona-charged by the high-voltage unit 135. Thereafter, an image (original image) radiated by the illumination lamp 103 is slit-exposed, thus forming an electrostatic latent image on the drum 131.

The latent image on the drum 131 is developed by a developing roller 140 of the developing device 139, and is visualized as a toner image. The toner image is transferred to a transfer sheet by the transfer charger 141, as will be described later.

More specifically, a transfer sheet in the upper or lower cassette 151 or 153 is fed into the apparatus main body by the sheet feed roller 155 or 157, and is then fed toward the photosensitive drum 131 while taking an accurate timing by the registration rollers 159. Thus, the leading edge of the latent image is caused to coincide with the leading edge of the transfer sheet. Thereafter, when the transfer sheet passes between the transfer charger 141 and the drum 131, the toner image on the drum 131 is transferred onto the transfer sheet. After the transfer operation is completed, the transfer sheet is separated from the drum 131 by the separation charger 143, and is guided to the fixing device 163 by the conveyor belt 161. The transfer sheet is subjected to fixing by compression and heating, and is then discharged by discharge rollers 165 onto a discharge tray T outside the main body 100.

After the transfer operation, the drum 131 is rotated and its surface is cleaned by the cleaning device 145 constituted by a cleaning roller and an elastic blade.

B. Automatic Original Feeder (ADF) (200)

FIG. 2 shows an internal arrangement of the ADF 200.

In FIG. 2, originals 2 are stacked and set on a stacking tray (stacker) 1. The tray 1 is inclined downward toward an original feed direction so that the original feed side is lower. Originals to be fed are stacked on the tray 1 while being registered in the feed direction. A semi-circular roller 4 is rotated in a direction of an arrow in FIG. 2 to feed an original toward a downstream separation unit. When no original is stacked on the tray 1, the roller 4 is stopped while its notch portion faces up. A feed roller 5 is rotated in a direction of an arrow in FIG. 2 to feed an original on the tray 1. Furthermore, separation rollers 6a and 6b rotate a separation belt 6 in a direction of an arrow in FIG. 2 so as to separate a lowermost original from originals stacked on the tray 1. The feed roller 5 and the separation belt 6 constitute a separation/supply unit.

Transmission type photosensors 3a and 3b detect the presence/absence of an original placed on the tray 1. The photosensor 3a comprises an LED (light-emitting diode) and the photosensor 3b comprises a phototransistor. An original fed from the separation/supply unit (5, 6) goes along a sheet path I, and is clamped between feed rollers 9a and 9b which are urged against each other. The original is then fed onto a sheet path III on the platen glass 101 through a sheet path II upon rotation of the rollers 9a and 9b in a direction of an arrow in FIG. 2. Sheet feed sensors 8a and 8b arranged near and at the upstream side of the feed rollers 9a and 9b are transmission type photosensors for detecting leading and trailing edges of an original.

A full-width belt 11 arranged adjacent to and above the platen glass 101 is an endless belt having a width large enough to cover the entire surface of a sheet original, and its surface has a sufficient frictional coefficient, so that an original is slidable along the platen glass 101 by a frictional force and conveyed in a direction of an arrow in FIG. 2. The belt 11 is looped between a driving roller 10a and a turn roller 10b so as to prevent slipping between the full-width belt 11 and the driving roller 10a.

First discharge rollers 18a and 18b arranged at an entrance of a sheet path VI at the downstream side of the sheet path III are urged against each other. The rollers 18a and 18b clamp and convey an original discharged from the platen glass 101 upon movement of the full-width belt 11 in the direction of a solid arrow in FIG. 2 while being rotated in the direction of an arrow in FIG. 2. The original is then clamped between second discharge rollers 20a and 20b through a sheet path VI which is bent upward, and is discharged onto a discharge tray 24 thereabove. A sheet discharge sensor 19 arranged midway along the sheet path VI is a reflection type photosensor for detecting the leading and trailing edges of an original.

In dual original reading, upon reverse movement of the full-width belt 11 in a direction of a dotted arrow, an original on the platen glass 101 is fed in a reverse direction onto the sheet path IV, and is then clamped between a large-diameter reverse roller 16 and a reverse roller 17. Thereafter, the original is fed to the sheet path V along the roller 16 upon rotation of the large-diameter reverse roller 16 in a direction of the solid arrow in FIG. 2. The leading edge of the original is clamped between the feed rollers 9a and 9b, and is fed onto the platen glass 101 through the sheet path II. Thus, the original is reversed with respect to the platen glass 101.

The feed roller 5, the semi-circular roller 4, and the separation rollers 6a and 6b of the separation/supply unit are connected to a separation driving motor 7 through a transmission mechanism, and are driven in a direction of an arrow in FIG. 2.

The feed rollers 9a and 9b, the belt driving rollers 10a and 10b, and the large-diameter reverse roller 16 are driven by a belt driving motor 12 through a transmission mechanism. The motor 12 is reversible. For example, when the motor 12 is rotated in the clockwise (CW) direction, the rollers are rotated in the direction of the solid arrow, while when the motor 12 is rotated in the counterclockwise (CCW) direction, the belt driving rollers 10a and 10b and the large-diameter reverse roller 16 are rotated in the direction of the dotted arrow, but the feed rollers 9a and 9b are not rotated. In this manner, these rollers constitute a clutch mechanism. The rotating shaft of the belt driving motor 12 is connected to an electromagnetic brake 13, a clock disc 14, and a clock generator 15. Upon rotation of the motor 12, the clock generator 15 generates a pulse signal.

The first discharge rollers 18a and 18b and the second discharge rollers 20a and 20b are connected to a discharge driving motor 21 through a transmission mechanism, and are driven in a direction of an arrow in FIG. 2. The rotating shaft of the discharge driving motor 21 is connected to a clock disc 22 and a clock generator 23. Upon rotation of the motor 21, the clock generator 23 generates a pulse signal.

C. Key Group (600)

Figure 3:
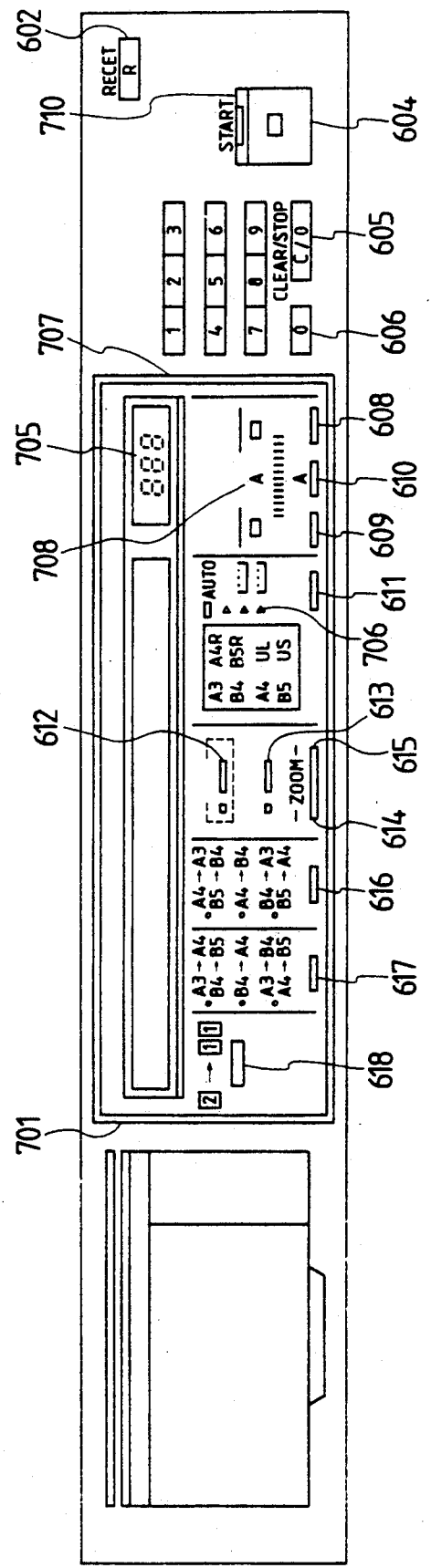
FIG. 3 is a plan view showing an arrangement of an operation unit (operation panel) of the apparatus in the embodiment shown in FIG. 1.

In FIG. 3, an all-reset key 602 is depressed when a standard mode is resumed.

A copy start key 604 is depressed when a copying operation is started.

A clear/stop key 605 has functions of a clear key in a standby state, and of a stop key during a copying operation. The clear key is depressed when a preset copy count is canceled. The stop key is depressed when a continuous copying operation is interrupted. After a copying operation performed when the key is depressed is completed, the copying operation is stopped.

A ten-key pad 606 is depressed for setting a copy count.

Copying density keys 608 and 609 are depressed when a copying density is manually adjusted. An AE key 610 is depressed when a copying density is automatically adjusted in accordance with a density of an original or when an AE (automatic density adjustment) mode is canceled to select a manual density adjustment mode. A cassette selection key 611 is depressed when the upper or lower cassette 151 or 153 is selected. When an original is placed on the ADF 200, an APS (automatic paper cassette selection) mode can be selected by the key 611. When the APS mode is selected, the cassette storing the sheets having the same size as that of an original is automatically selected.

An equal-magnification 612 is depressed when a copying operation is performed at an equal magnification (original size). An auto-magnification key 613 is depressed when an image on an original is automatically reduced or enlarged in correspondence with the size of a designated transfer sheet. Zoom keys 614 and 615 are depressed when an arbitrary magnification is selected between 64 to 142%. Fixed magnification keys 616 and 617 are depressed when a fixed reduction/enlargement magnification is designated.

A key 618 is depressed when a single-mode copying operation is performed using a dual original. When this key is designated, the ADF 200 performs a dual-mode operation to be described later.

D. Display Group (700)

In FIG. 3, an LCD (liquid crystal) type message display 701 can display a message of 40 characters each constituted by, e.g., 5×7 dots.

A copy count display 705 displays a copy count or a self-diagnosis code. Cassette indicators 706 indicate a selected one of the upper and lower cassettes 151 and 153.

An AE indicator 708 is turned on when the AE (automatic density adjustment) mode is selected by the AE key 610.

A ready/wait indicator 710 consists of two, i.e., green and orange color LEDs. In a ready state (copy enable state), the green LED is turned on. In a wait state (copy disable state), the orange LED is turned on.

E. Control Unit (800)

Figure 4A:
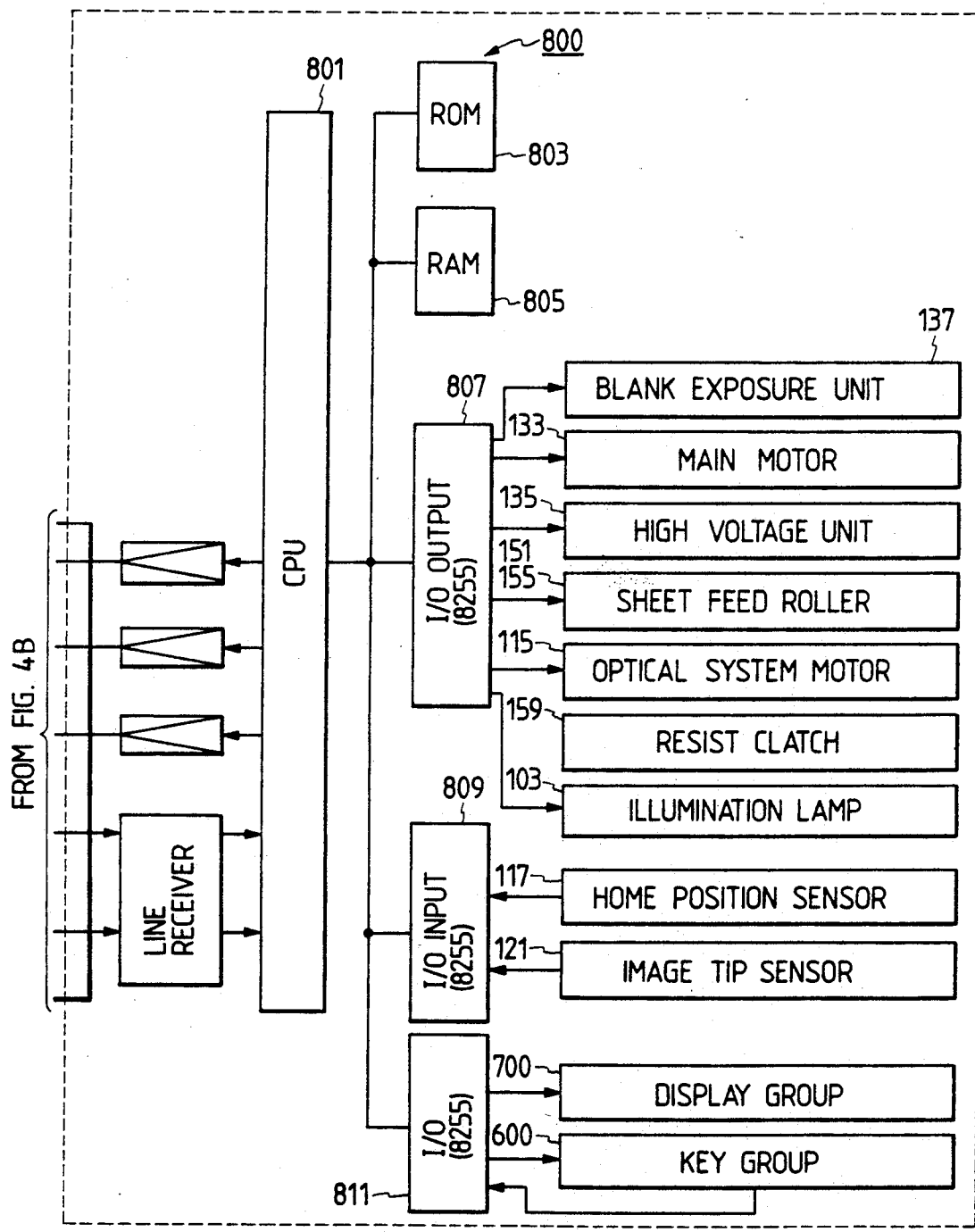
FIG. 4, consisting of FIGS. 4A and 4B, is a block diagram showing a circuit arrangement of a control system in the embodiment shown in FIG. 1.

FIG. 4A shows a circuit arrangement of a control unit 800 in the embodiment shown in FIG. 1. In FIG. 4, a CPU (central processing unit) 801 performs arithmetic control for carrying out the present invention, and comprises, e.g., a microcomputer μCOM87AD available from the NEC Corporation. A ROM (read-only memory) 803 prestores control sequences (control programs) according to the present invention. The CPU 801 controls constituting devices connected through a bus in accordance with the control programs stored in the ROM 803. A RAM (random access memory) 805 is a main memory used for storing input data and as a work storage area of the CPU 801.

An interface (I/O) 807 supplies a control signal from the CPU 801 to loads such as the main motor 133. An interface 809 receives input signals from sensors, e.g., an image tip sensor 121 and supplies them to the CPU 801. An interface 811 I/0 controls the key group 600 and the display 700. These interfaces 807, 809, and 811 comprise, e.g., an I/O circuit port μPD8255 available from NEC Corporation.

Note that the display group 700 includes the displays and indicators shown in FIG. 3, and employs LEDs and LCDs. The key group 600 includes the keys shown in FIG. 3, and the CPU 801 can detect a depressed key by a known key matrix.

F. ADF Control Unit (900)

Figure 4B:
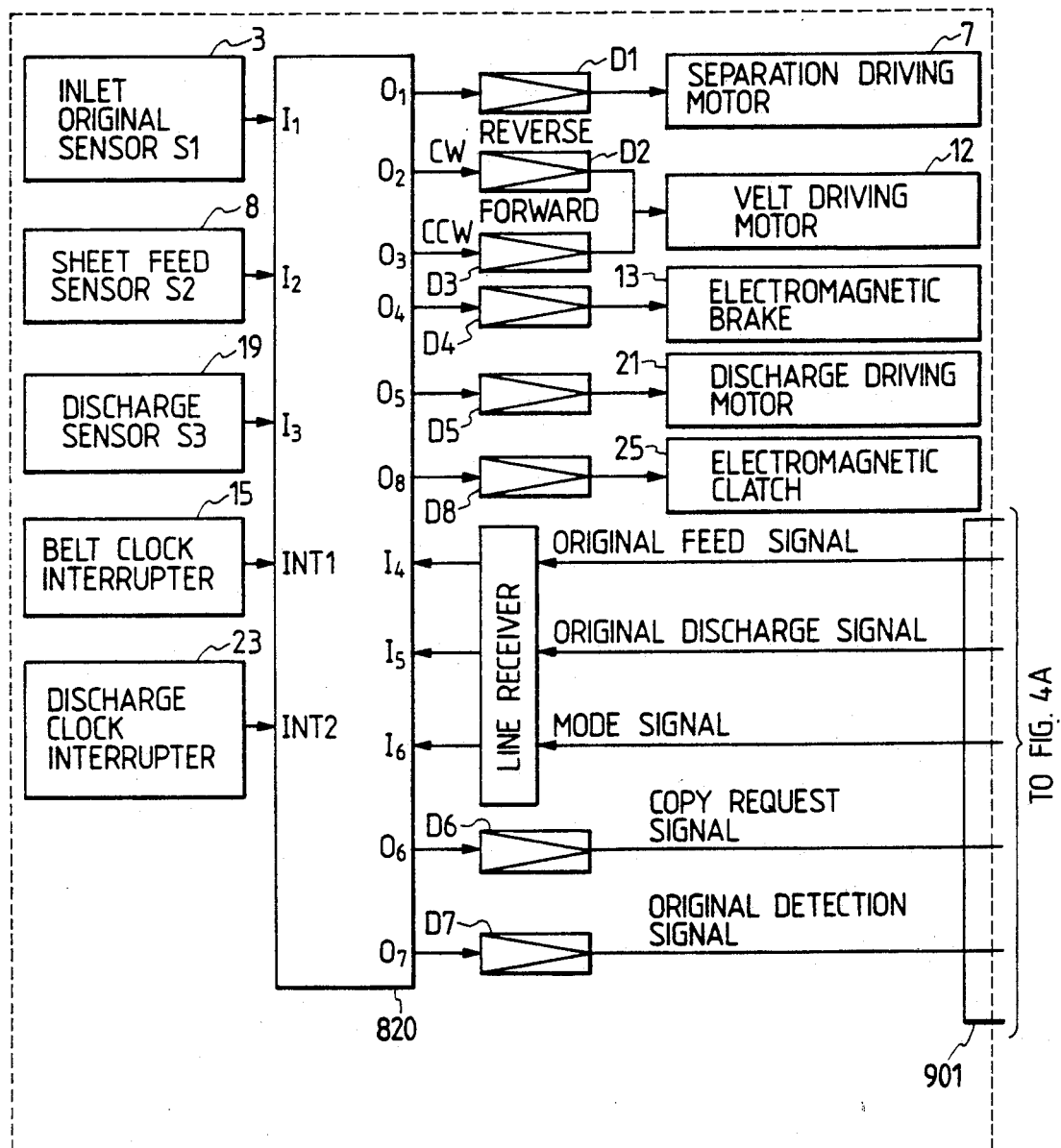
Figure 5B:
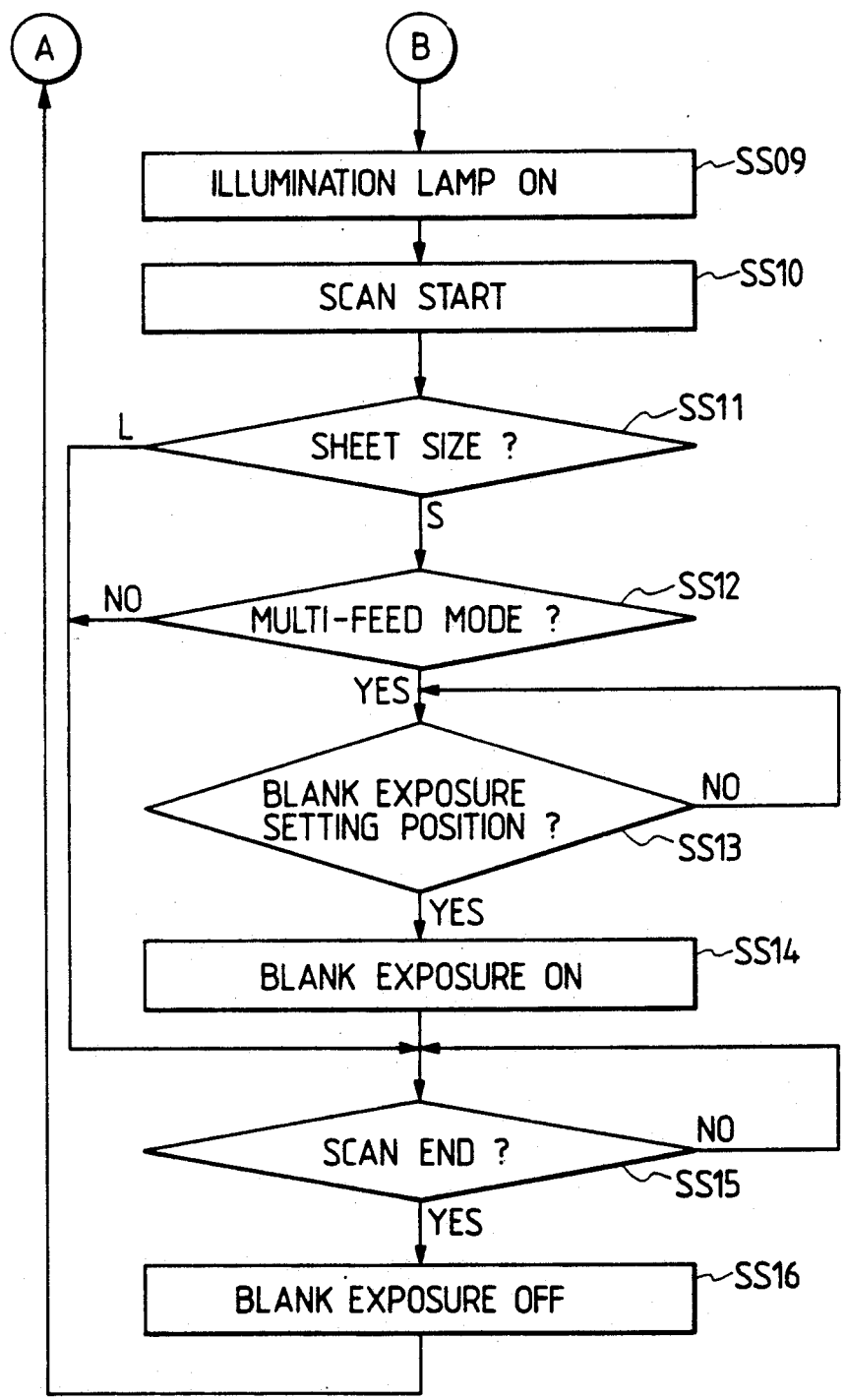
FIG. 5, consisting of FIGS. 5A and 5B, is a flow chart for explaining a control sequence of the image forming apparatus shown in FIG. 1.

FIG. 4B shows a circuit arrangement of a control circuit for the ADF 200 for performing the operation of the present invention. A controller 820 of this control circuit is mainly constituted by a known one-chip microcomputer incorporating a ROM and a RAM, and performs arithmetic control associated with he ADF 200 while exchanging signals with the CPU 801 of the copying apparatus main body 100.

Input ports $I_1$ to $I_3$ of the controller 820 respectively receive signals S1 from the inlet original sensors 3a and 3b arranged at the downstream side of the tray 1 of the ADF 200, signals S2 from the sheet feed sensors 8a and 8b arranged on the original convey path, and a signal S3 from the discharge sensor 19 arranged on the discharge path.

Microcomputer interruption terminals INT1 and INT2 of the controller 820, respectively, receive a signal from the belt clock interrupter 15 for detecting a rotation of the motor using the clock disc 14 attached to the motor shaft of the belt driving motor 12 described with reference to FIG. 2, and a signal from the discharge clock interrupter 23. These signals serve as reference clocks of a sheet feed moving amount of an original, as will be described later, and are used in count operations of internal counters of the controller 820.

On the other hand, output ports $O_1$ to $O_5$ of the controller 820, respectively, output an operation signal for the separation driving motor 7 described above, CW and CCW signals for rotating the belt driving motor 12 clockwise and counterclockwise, and an operation signal for the electromagnetic brake 13 and the discharge driving motor 21, and control output loads through corresponding drivers $D_1$ to $D_5$.

The controller 820 exchanges signals with the CPU 810 of the main body 100 through a cable 901. For this reason, input ports $I_4$ to $I_6$ of the controller 820 respectively receive an original feed signal, an original discharge signal, and a mode signal, and its output ports $O_6$ and $O_7$, respectively, output a copy request signal and an original detection signal through drivers $D_6$ and $D_7$. These signals will be described later.

Fetching of these input signals and ON/OFF operations of the loads are controlled by the microcomputer of the controller 820 in accordance with control programs (control sequences) shown in FIGS. 5 to 12 stored in an internal ROM of the controller 820.

The overall control operation of the CPU 801 of the main body 100 will now be described with reference to the flow chart of FIG. 5.

When a user sets a bundle of originals on the original tray 1 of the ADF 200, the inlet original sensor 3 (3a and 3b) is turned on (step SS01). Thus, one of the single and dual modes is set in accordance with a key state on the operation unit 600 (step SS02), and a key input of the copy start key 604 is checked (step SS03). When YES in step SS03, copying processing is started. If it is determined in step SS04 that the single mode is set, the original feed signal is enabled (ON) (step SS05), thus performing single-mode processing of the ADF 200 (step SS06; to be described later). An original is then stopped at an exposure position on the platen glass 101.

When the original is stopped at the exposure position, the copy request signal from the controller 820 of the ADF 200 is enabled (step SS07), and the original feed signal is disabled (OFF) (step SS08). Thus, the illumination lamp 103 is turned on (step SS09), and the optical system motor 115 is turned on to start original scan (step SS10).

In this case, only when the size of a fed original is a small size (e.g., B5 or A4) and the ADF 200 is set in a multi-feed mode (steps SS11 and SS12), blank exposure is performed parallel to image scan (steps SS13 and SS14). Thus, the latent image for an exposed original on the platen is erased.

When the image scan is completed (step SS15), if the blank exposure is ON, it is turned off (step SS16). The flow returns to step SS05, and processing in steps SS05 to SS16 is repeated to perform image reading.

If it is determined in step SS04 that the dual mode is set, the original feed signal is enabled in the same manner as in the single mode (step SS17), thus performing dual-mode processing of the ADF 200 (step SS18; to be described later). The flow then advances to step SS07. In step SS07 and subsequent steps, the same processing as in the single mode is executed to perform image reading.

Actual control operations when the ADF single mode (A) and ADF dual mode (B) are designated by the key on the operation unit 600 of the main body 100 will be described below with reference to the flow charts of FIGS. 5B to 12, FIGS. 13A to 13F for explaining the operations, and FIG. 2 showing the arrangement of the ADF.

A. (Single Mode) When four originals are copied

Figures 1, 6:
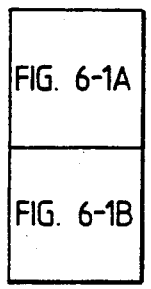

The flow chart of FIG. 6-1 shows the control sequence of the controller 820 in the single mode. In this case, the flow advances to step S1 for performing separation processing in FIG. 6-1. In a separation processing subroutine shown in FIG. 7, the controller 820 energizes (turns on) the separation driving motor 7 so that only a lowermost original page (4) of a bundle of originals placed on the tray 1 is separated (step S101). When the motor 7 is turned on, the semi-circular roller 4 is rotated, and the original page (4) moves in the sheet path I. When the sheet feed sensor 8 (8a and 8b) detects the leading edge of the original (step S102), a separation loop timer is started (step S103). After the timer is time-up (step S104), the separation driving motor 7 is deenergized (turned off) (step S105). Thus, the leading edge of the original abuts against a nip portion between the feed rollers 9a and 9b, and the original is stopped in a state wherein a predetermined amount of loop (curved shape) is formed. With the above operation, even if an original skews upon separation, the skew can be corrected.

The flow then advances to step S2 in FIG. 6-1 for performing sheet feed processing. In a sheet feed processing subroutine shown in FIG. 8, the belt driving motor 12 is turned on (forward) so as to drive the feed rollers 9a and 9b and the full-width belt 11 (step S201), so that an original is conveyed from the sheet path I to the path II. At the same time, a size check counter, in the controller 820, for counting clocks input from the belt clock interrupter 15 is started to measure an original size (step S202). This counter is arranged in the controller 820.

When the original is conveyed and its trailing edge leaves the sheet feed sensors 8a and 8b (step S203), the size check counter is stopped (step S204). Based on the count data, an original size is determined in a size check subroutine shown in FIG. 9 (step S205), and at the same time, a registration counter RGCN for stopping the original at the exposure position on the platen glass 101 is started (step S206). Until the count operation of the registration counter RGCN is completed (step S208), the speed of the belt driving motor 12 is decreased in order to precisely stop the original without causing a variation (step S207). Simultaneously with completion of the count operation of the registration counter RGCN, the belt driving motor 12 is turned off (step S209), and original feeding is instantaneously stopped by the electromagnetic brake 13. Thus, the original is precisely stopped at the exposure position on the platen glass 101 (step S210).

Figure 9:
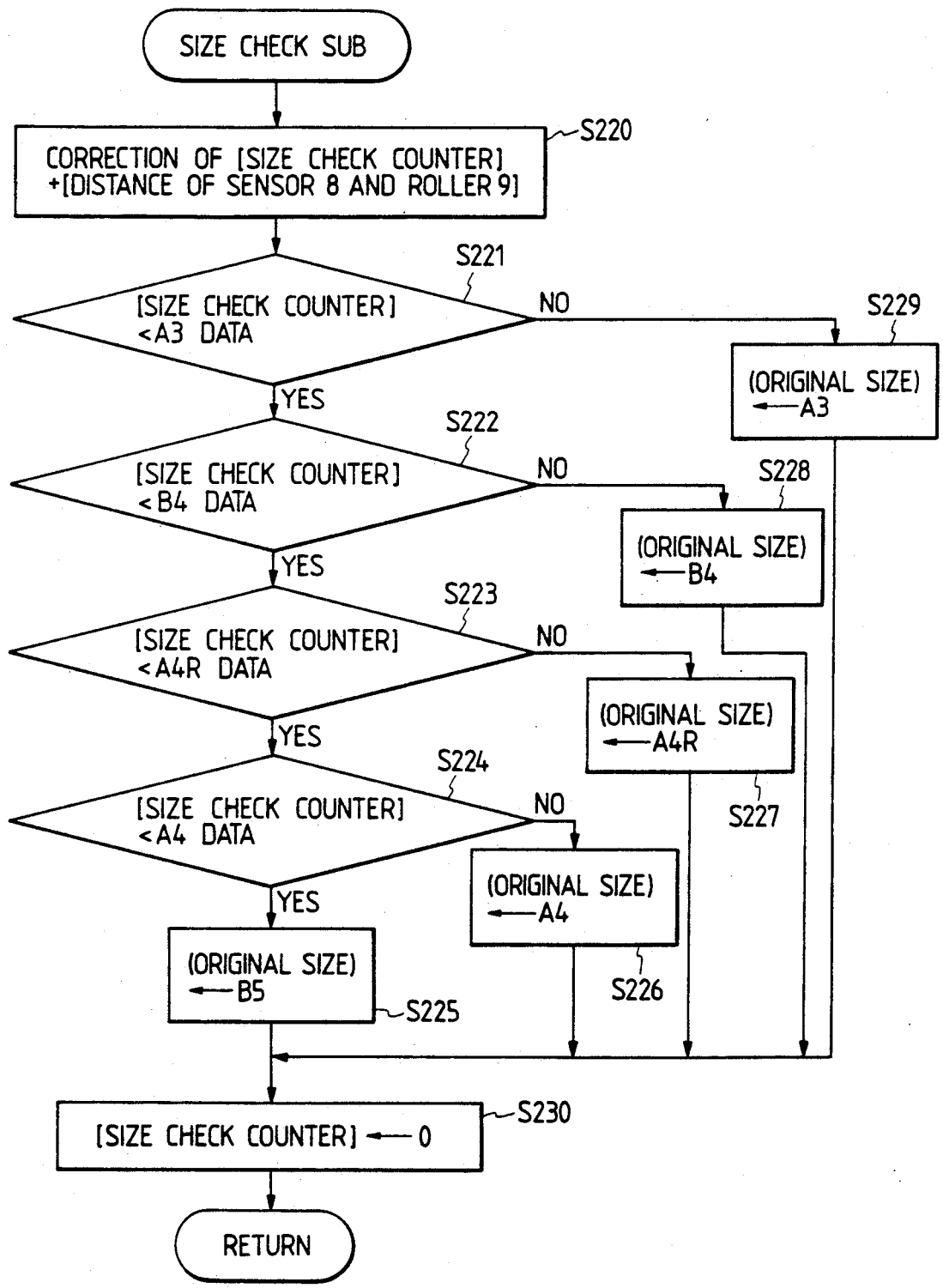

In the size check subroutine, as shown in FIG. 9, as a method of determining the original size, distances between the nip position between the feed rollers 9a and 9b and the sheet feed sensors 8a and 8b are added to the data of the size check counter to correct the count data, and the corrected data is used as a true original size. In this case, an original feed amount can reliably coincide with the count value by the belt clock interrupter (step S220). Thereafter, the original size, e.g., B5, A4, B4, A3, or the like is determined on the basis of the corrected original size data (steps S221 to S229), and the size check counter is cleared (step S230). Thereafter, the flow returns.

After the above-mentioned sheet feed processing, the flow advances to step S3 in FIG. 6-1, and a copy request signal is output to the CPU 801 of the main body 100. The CPU 801 of the main body temporarily disables the original feed signal in accordance with the input of the copy request signal, and operates the optical system to execute an exposure copying process for the original page (4) which is set on the platen glass 101 with an image surface facing down. An image of the original page (4) is copied on a first surface of a copying member (recording sheet), and the copying member is discharged onto the copy tray T with an image surface facing up (see FIG. 1).

During the exposure process of the main body 100, the program sequence of FIG. 6-1 advances to step S4, and whether or not the inlet original sensors 3a and 3b are turned off is checked to determine if feeding of all the originals is completed. In this case, since the original page (4) is being subjected to image recording processing, the inlet original sensors 3a and 3b are kept on. It is then checked if the mode signal input from the main body 100 to the input port I6 of the controller 820 indicates a multi-feed mode (step S5). If YES in step S5, whether or not the original size of the page (4) is larger than A4R is checked based on the original size data obtained in the original size determination of the size check subroutine described above (step S6), thereby changing the following program flow. In this case, a description will be continued assuming that the mode signal designates the multi-feed mode.

When the original size of the page (4) is smaller than A4R, the flow advances from step S6 to step S7, and the above-mentioned separation processing (step S1) is executed before the exposure process for the original page (4) is completed. Thus, the next original (3) is brought into contact with the feed rollers 9a and 9b and is stopped while forming a loop.

The flow then advances to step S8 to check if the original feed signal is ON. In this case, since the original feed signal is enabled upon completion of the exposure process of the original page (4) of the main body 100, the copy request signal is disabled in accordance with the ON original feed signal, and the next operation is performed (step S9).

In step S10, processing of a discharge processing 1 subroutine is started in response to an interruption signal. The flow then returns to step S2, and sheet feed processing of a page (3) is performed.

Figure 13A:
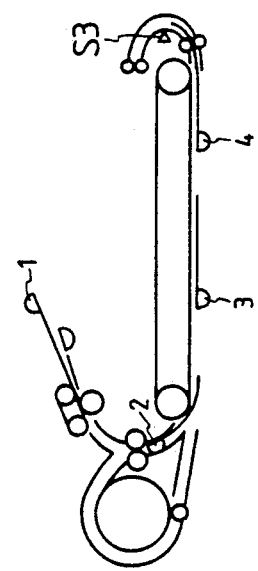
FIGS. 13A to 13F are views showing a conveyance state and the positional relationship of an original in the single mode in the embodiment of the present invention.

The processing sequence of the above-mentioned discharge processing 1 subroutine will be described below. A state obtained when the discharge processing 1 subroutine is started is as shown in FIG. 13A. In the discharge processing 1 subroutine shown in FIG. 10, it is waited until the discharge sensor 19 detects the leading edge of the page (4) (step S301).

Figure 13B:
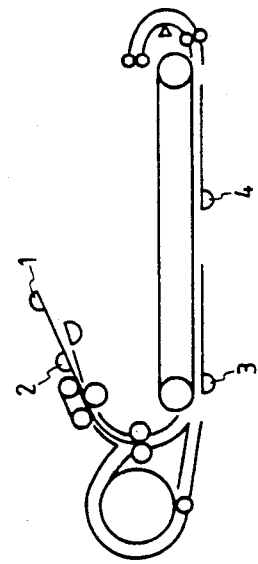

In this case, the full-width belt 10 is not driven during the discharge processing 1. For this reason, in the standby state, the flow temporarily returns to step S2, and sheet feed processing of the next original page (3) is performed. Steps S3 to S7 in FIG. 6-1 are then executed. In this case, the positional relationship of the originals is as shown in FIG. 13B. The original page (3) is then subjected to the discharge processing 1 (step S10).

Figure 13C:
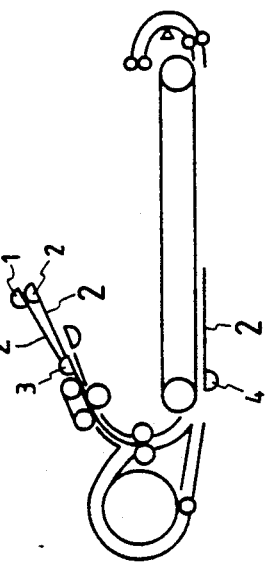

When the discharge sensor 19 detects the leading edge of the original page (4), as shown in FIG. 13C, during the sheet processing of the original page (2), a belt counter BC1 is started by a count value corresponding to a distance from the discharge sensor 19 to the nip position between the second discharge rollers 20a and 20b (step S302). The completion of the count operation of the belt counter BC1 is then determined (step S303).

Upon completion of the count operation of the belt counter BC1, the discharge driving motor 21 is turned on (step S304) to start discharging the original page (4), and it waits until the trailing edge of the original is detected by the discharge sensor 19 (step S305).

Figure 13D:
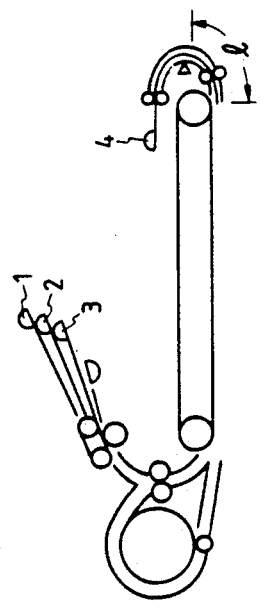

Thereafter, as shown in FIG. 13D, even when the sheet feed processing (step S2) of the original page (2) is completed and the full-width belt 10 is stopped, the original page (4) is kept discharged by the discharge rollers 20a and 20b in the direction of the arrow in FIG. 13D. When the discharge sensor 19 detects the trailing edge of the original page (4), to completely discharge this original, a discharge counter which counts the clocks from the discharge clock interrupter 23 is started (step S306). Until the count operation of the discharge counter is completed, speed control of the discharge driving motor 21 is performed so as to improve a matching characteristic upon discharging of the original (step S307), and a completion of the count operation of the discharge counter is waited (step S308). When the count operation of the discharge counter is completed, the discharge driving motor 21 is turned on, and the original is discharged onto the discharge tray 24, thus completing the discharge processing (step S309).

In this case, a feed amount by the discharge counter reliably coincides with the feed amount by the discharge rollers 20a and 20b.

While the inlet original sensors 3a and 3b detect an original, the above-mentioned processing sequence is repeated.

Thereafter, when the inlet original sensors 3a and 3b do not detect any original (in the embodiment shown in FIG. 13, when the sheet feed processing of the original page (1) is completed and determination processing in step S4 is executed, if the inlet original sensors 3a and 3b are turned off), NO is obtained in step S4, and the flow advances to step S11. In step S11, the original detection signal is disabled. When the original discharge signal from the main body 100 is set (step S12), the copy request signal is disabled (step S13), and processing of a discharge processing 2 subroutine is started in response to an interruption signal (step S14).

Figure 13E:
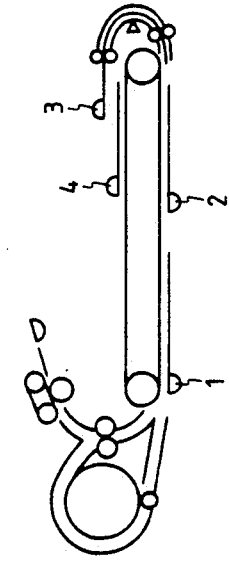

In this case, the positional relationship of the originals is as shown in FIG. 13E. In the discharge processing 2 subroutine shown in FIG. 11, the belt driving motor 12 is turned on (forward) (step S311) so as to discharge original pages (2) and (1) which are located on the platen glass 101.

In this case, the original pages (2) and (3) are simultaneously subjected to the above-mentioned discharge processing 1.

Figure 13F:
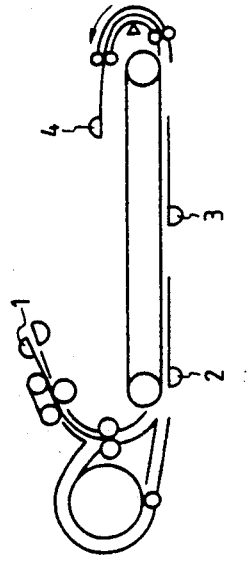

When the discharge sensor 19 detects the leading edge of the original page (2) (step S312), the count operation of the first belt counter BC1 is started as in the above-mentioned discharge processing 1 (step S313). When the count operation of the counter BC1 is completed (step S314), the discharge driving motor 21 is turned on (step S315), and a count operation of a second belt counter BC2 for determining a timing for enabling separation processing of the next original is started (step S316). In this embodiment, a count value of the counter BC2 corresponding to a position where the trailing edge of the original is separated from the position of the downstream belt roller 10b is preset. More specifically, as shown in FIG. 13F, as the count value of the counter BC2, {(original length) - l} is set. In this case, l is the distance between the belt roller 10b and the sensor 19.

When the count operation of the belt counter BC2 is completed (step S317), the belt driving motor 12 is turned off (step S318), and a separation start enabling flag is set (step S319). In this case, since no next original to be separated is present, an actual operation is not influenced. The influence of this flag will be described later.

Thereafter, the sequence for matching the discharged original is executed in the same manner as in the discharge processing 1, and the flow ends (steps S320 to S323).

Figures 1A, 6:
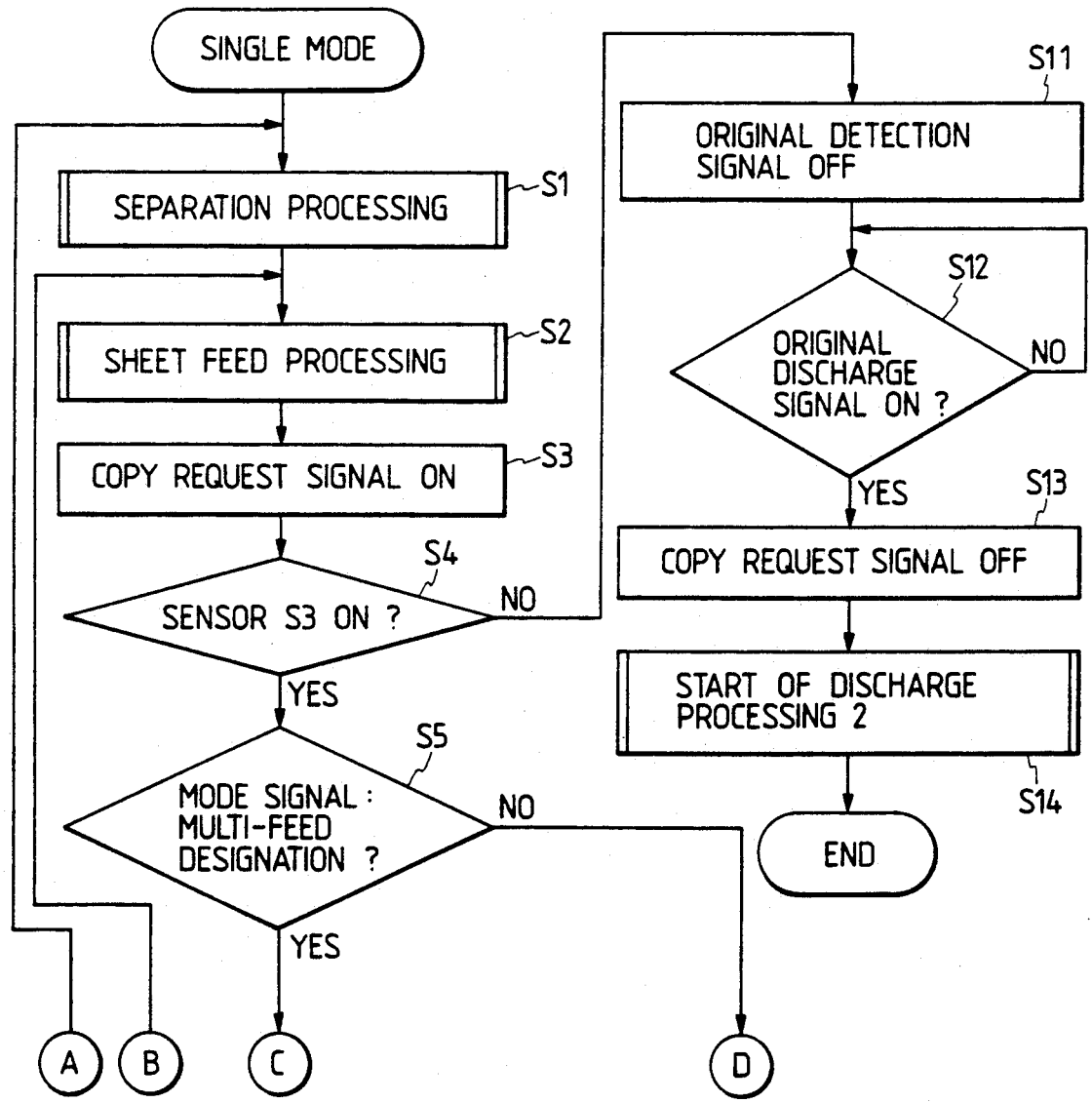
Figures 1B, 6:
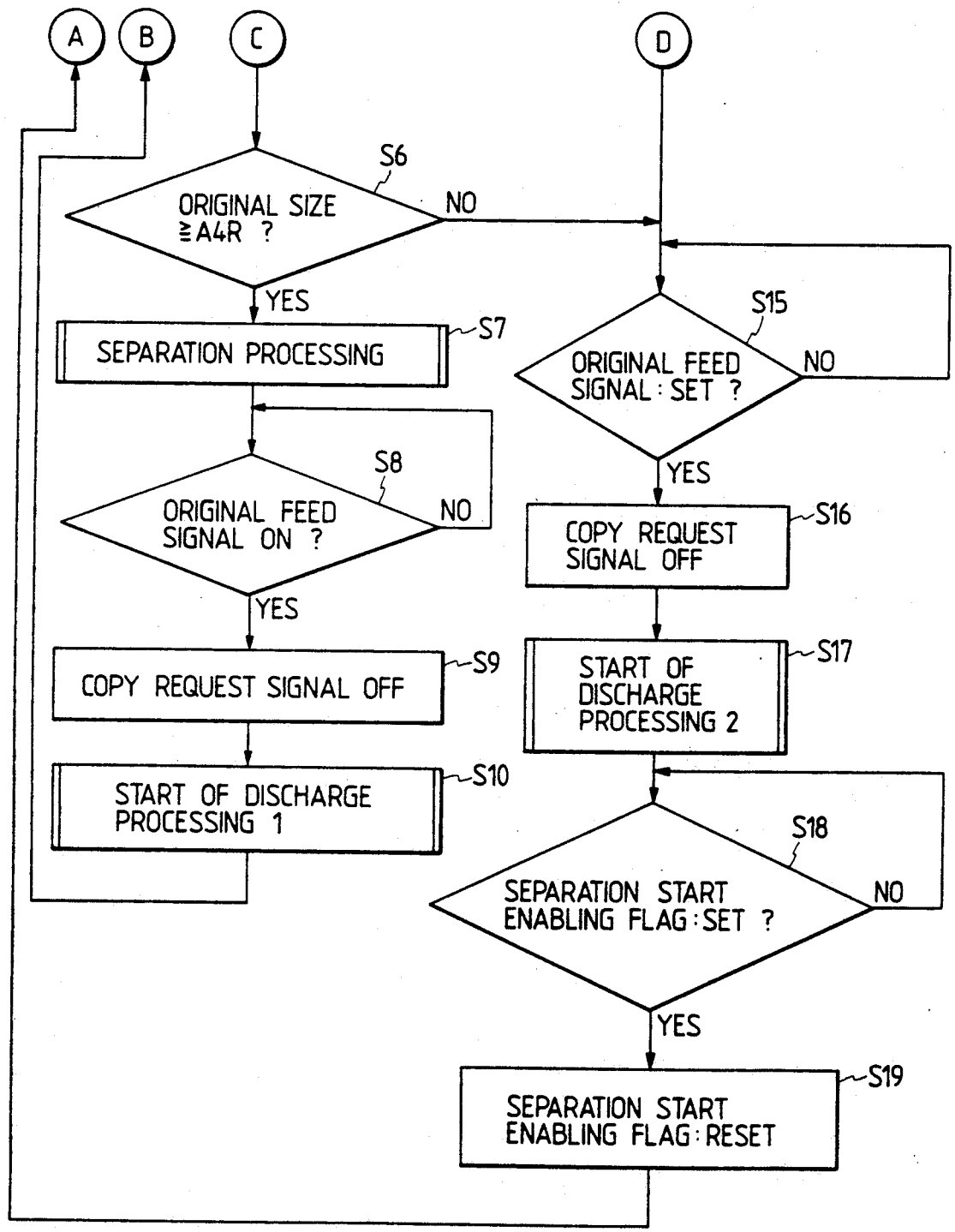
Figure 6:
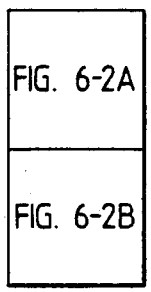
Figure 2A:
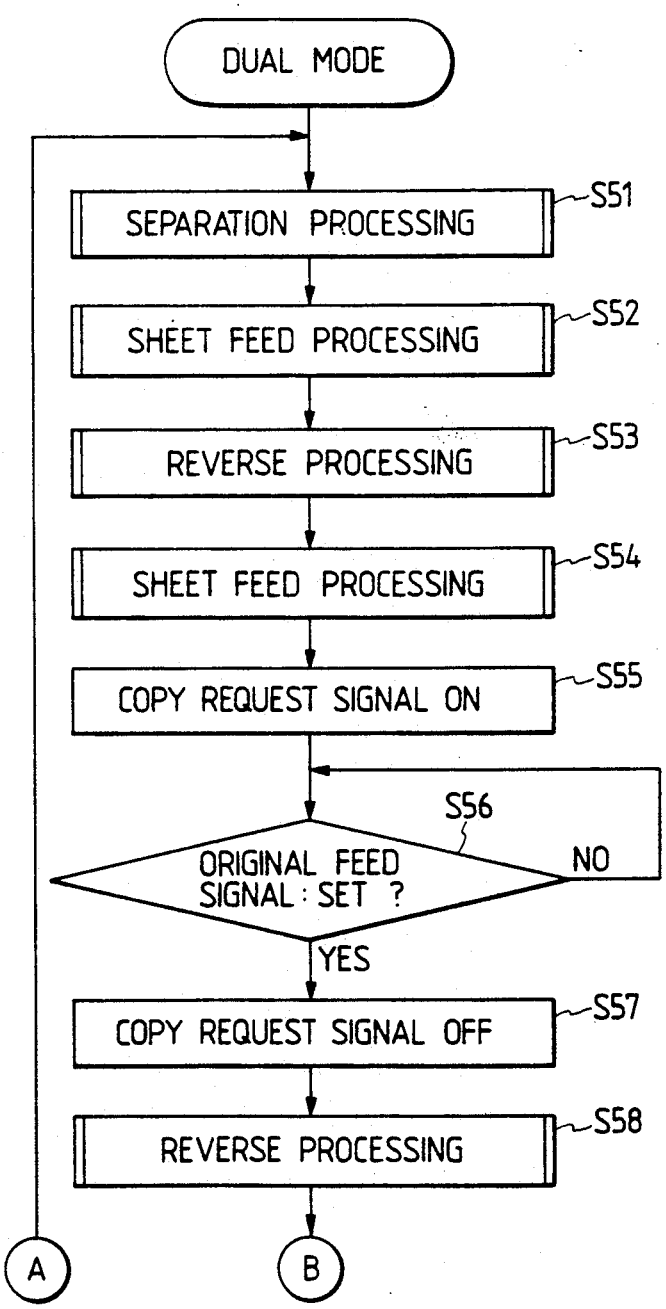
Figures 2B, 6:
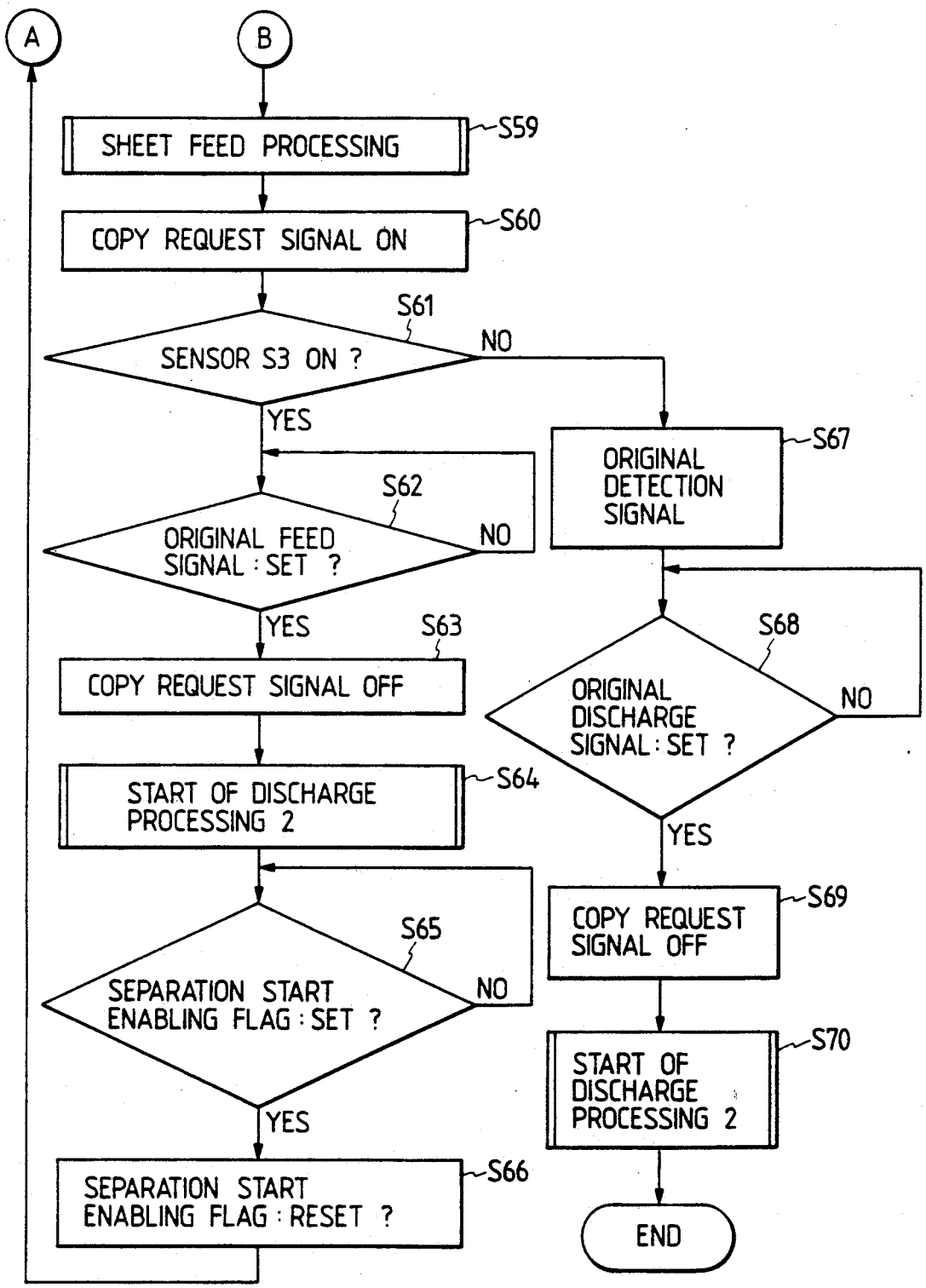
Figure 7:
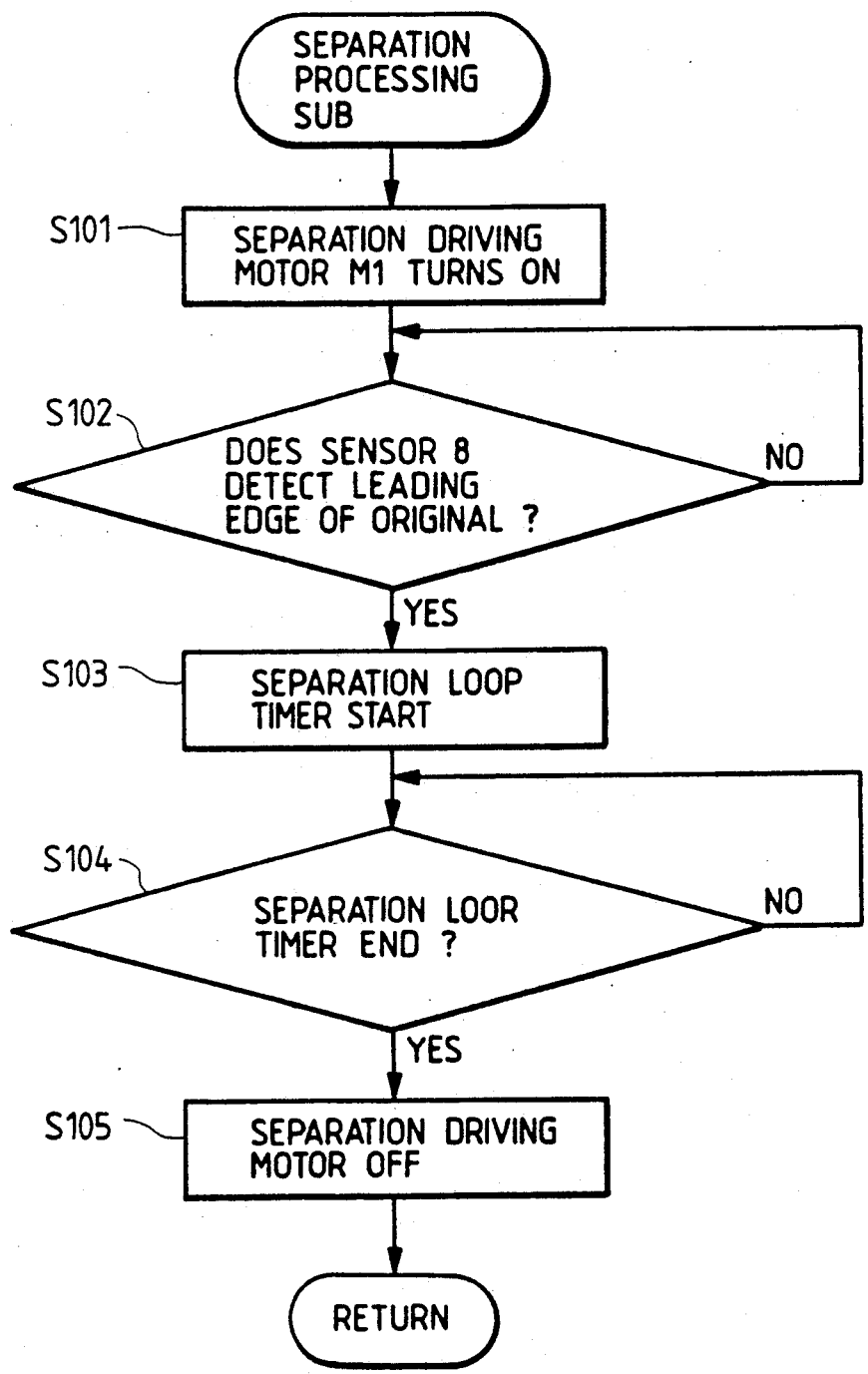

If it is determined in step S5 in FIG. 6-1A, that the mode signal does not designate the multi-feed mode, or if it is determined in step S6 that the original size is equal to or larger than A4R even if the multi-feed mode is designated, the flow advances to step S15 so that the multi-feed mode is stopped, and a sequence for reliably discharging the original by the discharge rollers 20a and 20b is switched. In step S15, it is waits until the original feed signal from the CPU 801 of the main body 100 is set. When this signal is set, the copy request signal is disabled (step S16), and the above-mentioned processing of the discharge processing 2 is started in response to an interruption signal (step S17).

Thereafter, if it is detected that the separation start enabling flag is set in step S319 in the discharge processing 2 of the original page (4) (step S18), this flag is reset at the same time, and separation processing of the next original, i.e., the original page (3) is started (step S19). Thereafter, the above-mentioned processing is repeated until all the originals are fed from the original tray 1.

B. (Dual Mode) When two dual side originals are copied

Figure 14B:
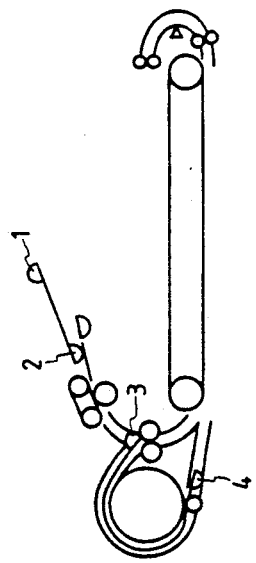
Figure 14C:
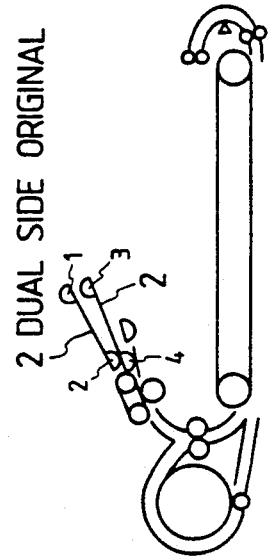
Figure 14D:
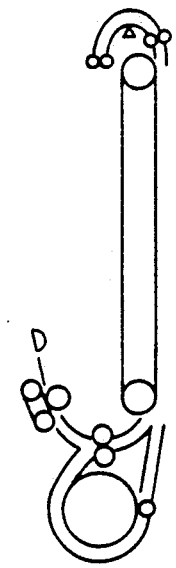

The flow chart of FIG. 6-2 shows a control sequence of the controller 820 in the dual mode. When the dual mode is designated, the above-mentioned separation processing of the lowermost original (page (3)/(4), FIG. 14A) on the original tray 1 is performed (step S51, see FIG. 7) in the same manner as in the single mode. After the sheet feed processing is performed (step S52, see FIG. 8), the flow advances to step S53 for executing reverse processing to copy the page (4). In a reverse processing subroutine shown in FIG. 12, the belt driving motor 12 is turned on (reverse) so that the full-width belt 11 is driven to convey the original on the platen glass 101 from the sheet path III to the sheet path IV (step S410).

The original is then gripped between the large-diameter reverse roller 16 and the small-diameter reverse roller 17. Along with rotation of the large-diameter reverse roller 16, the original travels upward in the sheet path V. When the sheet feed sensors 8a and 8b detect the leading edge of the original (step S402), a reverse loop counter is started (step S403). After the count operation of this counter is completed (step S404), the belt driving motor 12 is turned off (step S405). Thus, a loop for correcting skew is formed as in the separation processing, and a standby state is set (see FIG. 14B).

When the above-mentioned reverse processing is completed, the sheet feed processing is performed (step S54) as in the single mode, and the copy request signal is enabled (step S55). When the original feed signal from the CPU 801 of the main body 100 is set (step S56), the copy request signal is disabled (step S57).

The above-mentioned reverse processing is performed (step S58) so as to copy the page (3). The sheet feed processing is performed (step S59), and the copy request signal is enabled (step S60). The output states of the inlet original sensors 3a and 3b are discriminated. When these sensors detect the next original (step S61), the flow advances to step S62. If it is determined in step S62 that the original feed signal from the CPU 801 of the main body 100 is set, the copy request signal is disabled (step S63), and the above-mentioned discharge processing 2 is started in response to an interruption signal (step S64).

Figure 14E:
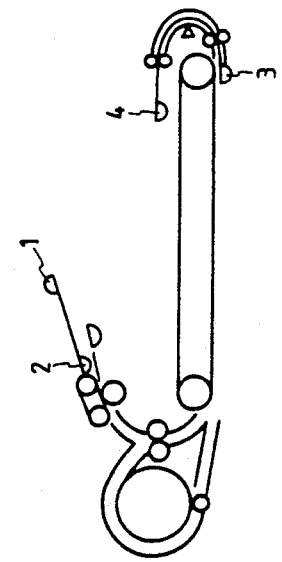
Figure 14F:
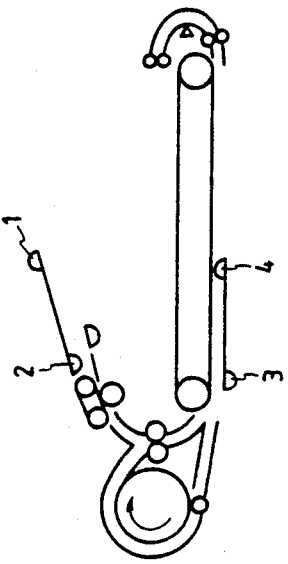

After the discharged original has reached a predetermined position (see FIG. 14E) and the separation start enabling flag is set (step S65), the separation start enabling flag is reset (step S66), and the flow returns to step S51 to start processing of the next original. Thereafter, the above-mentioned processing is repeated until all the originals are fed from the original stacking tray 1, i.e., until the inlet original sensors 3a and 3b no longer detect the original in step S61. If it is determined in step S61 that the inlet original sensors 3a and 3b do not detect the original, the flow advances to step S67, and the original detection signal is disabled. If it is determined in step S68 that the original discharge signal from the CPU 801 of the main body 100 is set, the copy request signal is disabled (step S67). The above-mentioned discharge processing 2 is started and the flow ends (step S70).

The operation mentioned above is sequentially executed for originals stacked on the original stacking table 1, so that single-side copies or dual-side copies can be obtained on the discharge tray T of the main body 100 in the order of pages as that of the originals set on the table 1.

With the above arrangement, a loss in exchange time of originals is not influenced by the original size, and can be always minimized. The exchange time of originals can be shortened and a copy speed can be increased without increasing a convey speed of the original.

An original can be prevented from being unnecessarily copied.

When an original to be discharged extends over a convey means and a discharge means, the speed of the discharge means is set to be equal to or higher than the speed of the convey means, and the speed of the discharge means is decreased when the original leaves a processing unit, a damage and contamination of a large-size original can be prevented when it is discharged, and discharge matching of originals can be improved.

In the above embodiment, after an original is fed to the exposure position, the next original is conveyed to the rollers 9a and 9b and is waited at that position. However, an arrangement can be modified such that the original is held at a position closer to the platen (end face of the platen glass).

Figure 15A:
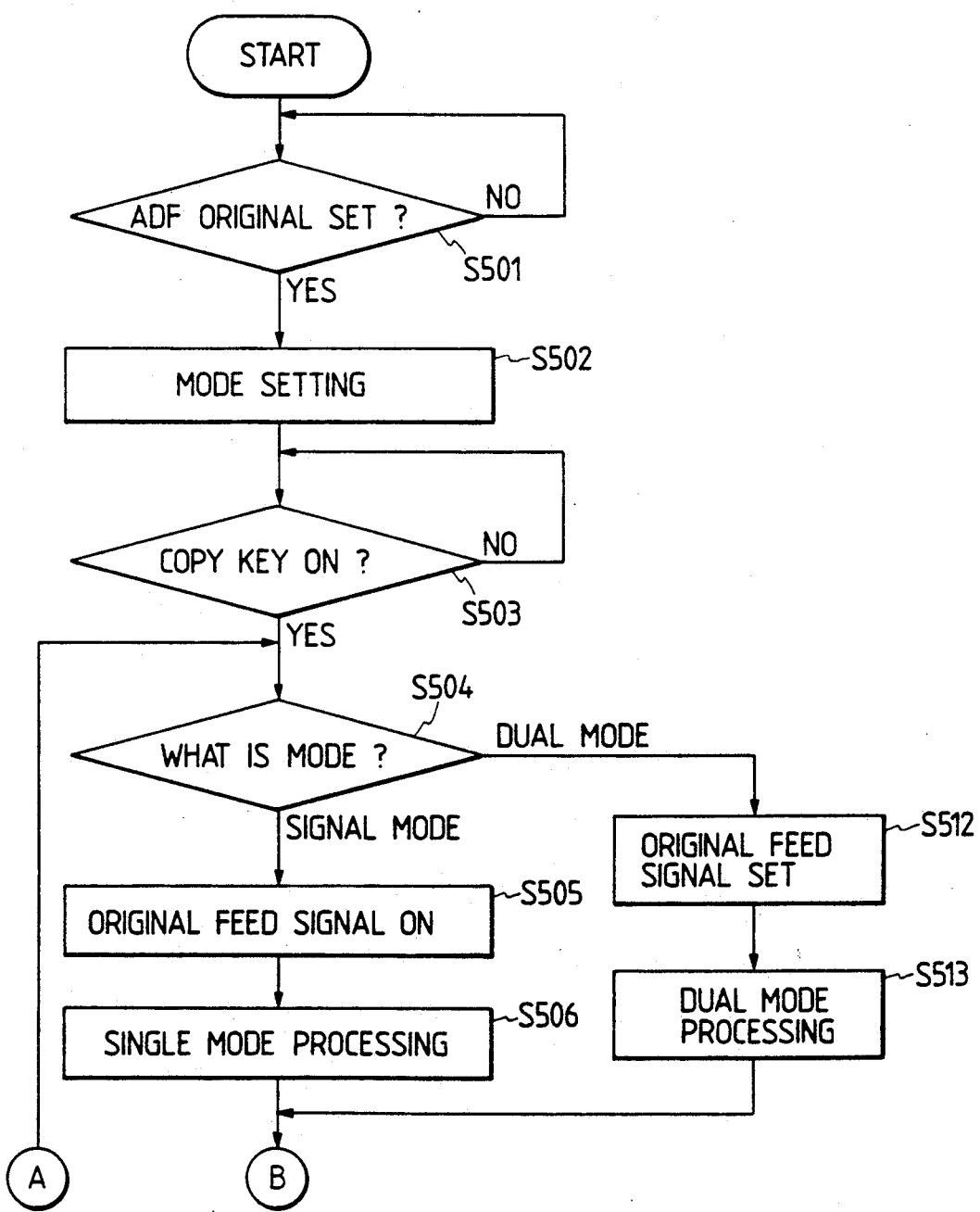
FIGS. 15, consisting of FIGS. 15A and 15B, to 17 are flow charts showing control sequences in another embodiment of the present invention.
Figure 15B:
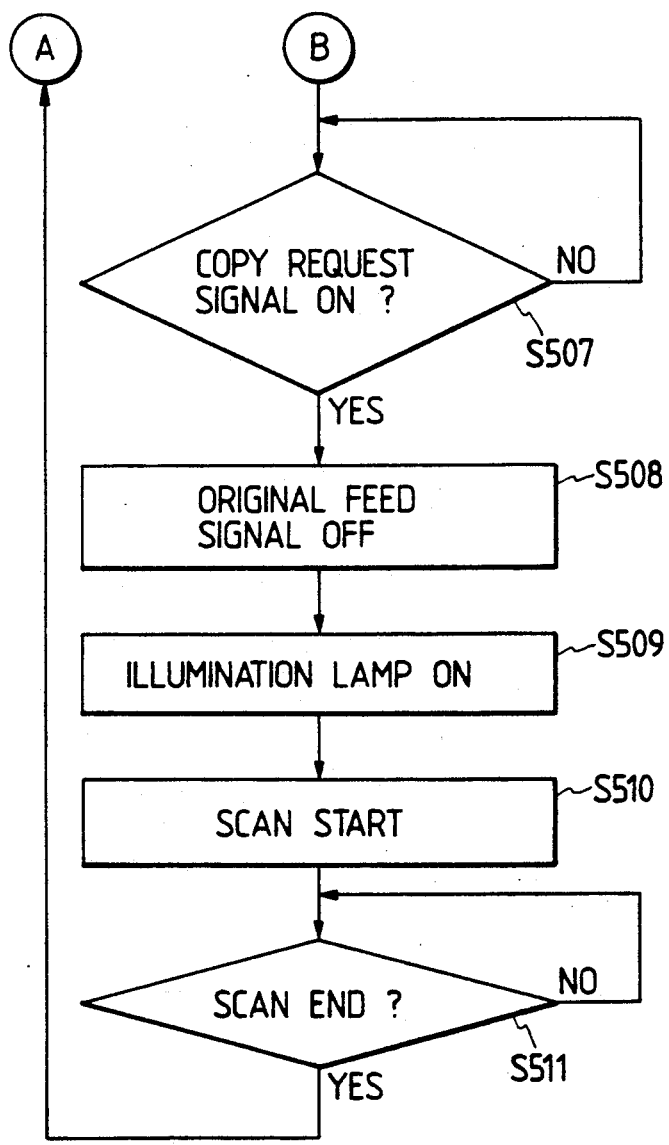

FIG. 15 is a flow chart for explaining the overall control operation of the CPU 801 of this embodiment.

In FIG. 15, a bundle of originals are set on the original stacking tray 1 of the ADF 200 (step S501), and the single or dual mode is set by the key 618 on the operation unit (step S502). The copy start key 604 is then depressed (step S503) to start processing. If it is determined in step S504 that the single mode is set, an original feed signal is enabled (step S505), so that single-mode processing (to be described later) of the ADF 200 is performed (step S506). An original is stopped at an exposure position on the platen glass 101. A copy request signal from the ADF 200 is enabled (step S507), and the original feed signal is disabled (step S508). The main body 100 of the copying machine turns on the illumination lamp 103 (step S509), and turns on the optical system motor 115, thereby starting scan (step S510). Upon completion of the scan (step S511), the flow returns to step S504. Steps S504 to S511 are then repeated to perform image reading and copying operations. If it is determined in step S504 that the dual mode is set, the original feed signal is enabled (step S512) in the same manner as in the single mode, so that dual-mode processing (to be described later) of the ADF 200 is executed (step S513). After step S507, image reading is performed in the same steps as in the single mode.

Figure 16:
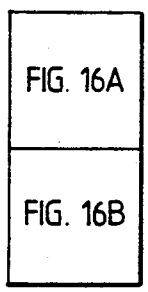
FIG. 16, consisting of FIG. 16A and 16B is a flow chart of the Single Mode operation.

FIG. 16 shows a flow chart in the single mode of this embodiment. In this embodiment, in steps denoted by the same reference numerals as in FIG. 6-1, the same processing operations are executed.

If the original size is smaller than A4R, separation processing (step S7) and pre-feed processing (step S20) are executed before an exposure process of an original page (4) is completed, and a next page original (3) is conveyed to and stopped at the end face of the platen glass 101. Note that other processing operations are substantially the same as those in the above embodiment, and a detailed description thereof will be omitted.

Figure 17:
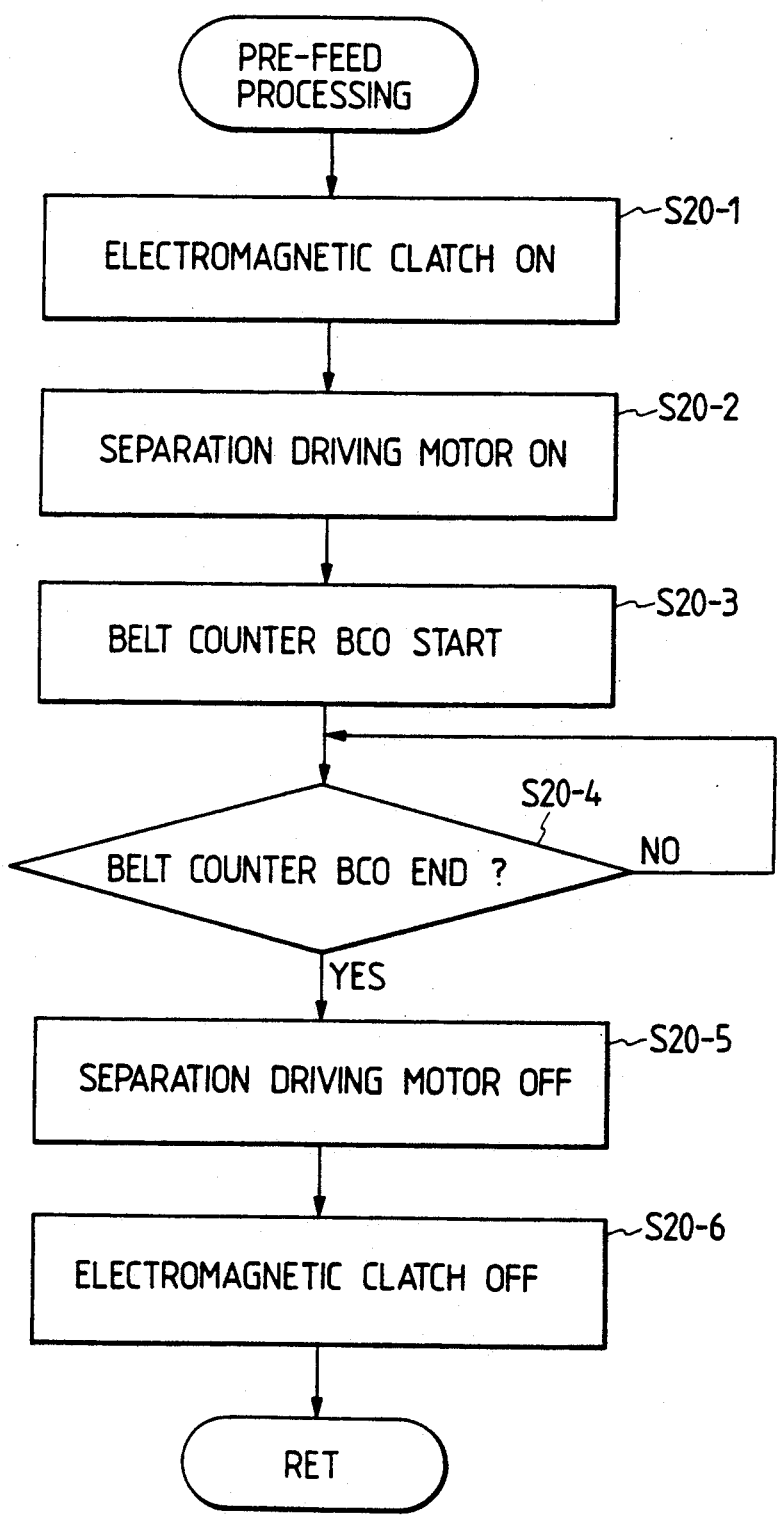
Figure 18A:
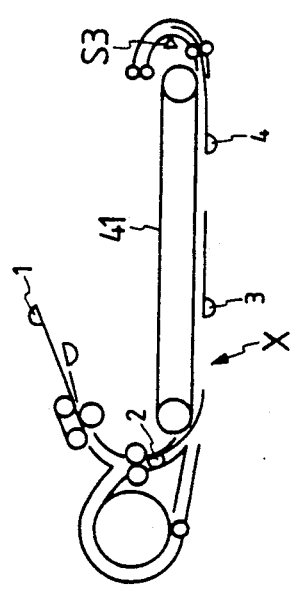
FIGS. 18A to 18F are views showing a conveyance state and the positional relationship of an original in the single mode in the other embodiment of the present invention.
Figure 18B:
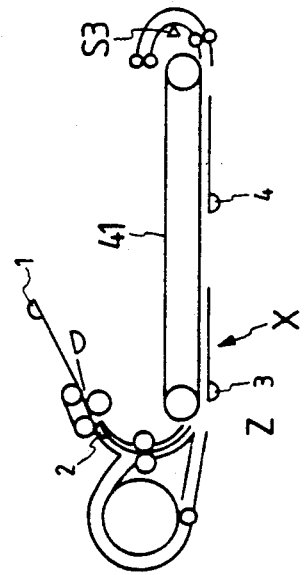
Figure 18C:
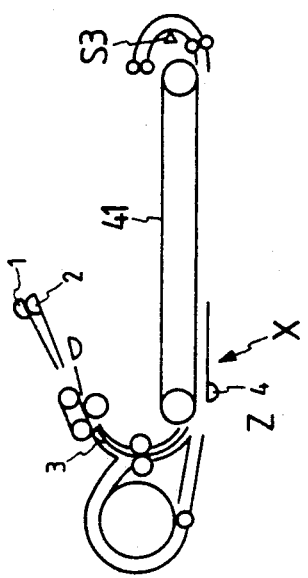
Figure 18D:
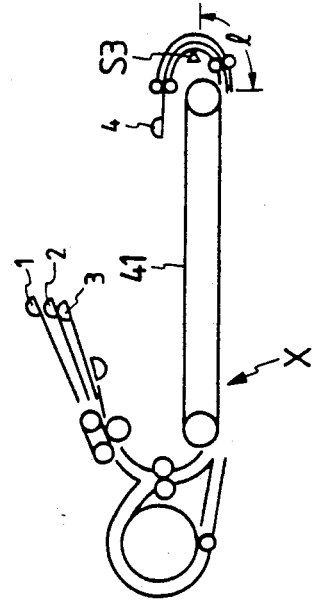
Figure 18E:
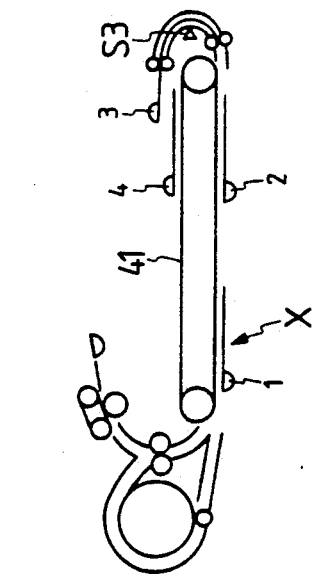
Figure 18F:
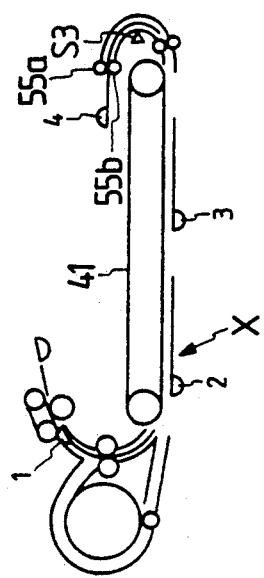

The pre-feed processing routine will be described below with reference to FIG. 17.

When the separation processing is completed while the leading edge of the original is brought into contact with the nip portion between the feed rollers 9a and 9b, the flow advances to step S20 for performing the pre-feed processing. As shown in FIG. 17, an electromagnetic clutch 25 is turned on (step S20-1), and the separation driving motor 7 is turned on (step S20-2). Thus, the separation unit (5, 6) and the feed rollers 9a and 9b are started. At the same time, a belt counter (BC0) is started (step S20-3), and a completion of the count operation of the belt counter (BC0) is waited (step S20-4). The belt counter (BC0) is set to be a value corresponding to a distance from the central line of the feed rollers 9a and 9b to the end face (Z in FIG. 2) of the platen glass 101. When the count operation of the belt counter (BC0) is completed, the separation driving motor 7 is turned off (step S20-5), and the electromagnetic clutch 25 is turned off (step S20-6). Thus, the leading edge of the original before exposure reaches the end face of the platen glass 101, i.e., is fed immediately before the original which is being exposed.

The flow then advances to step S8 and subsequent steps.

In this manner, a loss in exchange time of originals can be further decreased as compared to the above embodiment.

What is claimed is:

1. An original handling apparatus comprising:
    convey means for feeding an original from an exposure start end on a platen, stopping the original at a first position on the platen, and discharging the original from the first position to an opposite end to the exposure start end after exposure of the original is completed, said convey means having detecting means, provided upstream beyond the platen with respect to an original conveying direction, for detecting a trailing edge of the original; and
    control means for providing such a control that when said detecting means detects a trailing edge of a first original, after a predetermined time elapsed, the first original is stopped in conveyance at the first position on the platen, and a second original is fed to a second position located upstream beyond the platen and stopped thereat,
    wherein said control means further provides such a control that after exposure of the first original is completed, the first and second originals are fed, and when said detecting means detects a trailing edge of the second original, after the predetermined time elapsed, the first and second original are stopped in conveyance so that the first original is stopped at a third position located downstream below the first position with respect to an original conveying direction, the second original is stopped at the first position, respectively, and a third original is fed to the second position, and stopped thereat.

2. An apparatus according to claim 1, wherein said convey means comprises, at the upstream side of the platen, feed rollers for feeding the original, and said control means controls said convey means so that the second original is waited while being abutted against said feed rollers.

3. An apparatus according to claim 1, wherein said control means controls said convey means so that the second original is waited while being fed to the start end of the platen.

4. An image forming apparatus having an original handling apparatus, comprising:
    a platen for placing an original thereon;
    image forming means for forming an image on a recording member in accordance with an original image by scanning the original placed on said platen;
    convey means for feeding the original and stopping the original at a first position on said platen, after the scan is completed, feeding the scanned original and stopping the original at a second position on said platen, and feeding a next original and stopping the original at the first position on said platen; and
    inhibition means for inhibiting formation of an image on the recording member in accordance with the original at the second position on said platen, wherein said inhibition means inhibits formation of an image according to the original at the second position in accordance with a size of the recording member.

5. An apparatus according to claim 4, wherein said image forming means forms an electrostatic latent image on a photosensitive body in accordance with the original image, develops the latent image, and transfers the developed image onto the recording member, thereby forming the image on the recording member.

6. An apparatus according to claim 5, wherein said inhibition means comprises erase means for erasing the electrostatic latent image formed on said photosensitive body in accordance with the original located at the second position.

7. An apparatus according to claim 6, wherein said erase means comprises blank exposure means.

8. An original handling apparatus comprising:
convey means for feeding a first original and stopping the first original at a first position on a platen, after scan is completed, feeding the first original and stopping the first original at a second position on the platen and feeding a second original and stopping the second original at the first position on the platen;
discharge means provided downstream below the platen with respect to an original conveying direction, for discharging the original from said convey means, said discharge means having means for detecting a presence or absence of the original; and
control means for providing such a control that if said detecting means detects the first original, when the second original is fed by said convey means to the second position and stopped thereat, after scan of the second original is completed, said discharge means is operated while said convey means is stopped in operation.

9. An original handling apparatus comprising:
convey means for conveying an original in a plurality of modes, the original to be scanned, when said convey means is operated in a first convey mode the original is fed to and stopped at a first position on a platen, after scan is completed, the scanned original is fed to and stopped at a second position on the platen, and a next original is fed to and stopped at the first position on the platen, and when said convey means is operated in a second convey mode the original is fed to and stopped at the first position on the platen, after the scan is completed, the original is discharged from the first position and a next original is fed to and stopped at the first position on the platen;
setting means for setting one of the first and second convey modes, said setting means enables the first convey mode to be set in a single-side mode wherein only one side of the original is scanned, and prohibits the first convey mode from being set in a duel-side mode wherein both sides of the original are scanned; and
control means for controlling said convey means to be operated in the first or second convey mode in accordance with a setting signal from said setting means.

10. An apparatus according to claim 9, wherein said convey means is operative, in the duel-side mode, to discharge the original after completion of scanning for both of the sides of the original, and to feed the next original to the first position.

11. An apparatus according to claim 9, wherein said setting means includes detecting means for detecting an original size, and the first and second convey modes are set in accordance with the original size detected by said detecting means.

12. An apparatus according to claim 11, wherein when the original size is equal to or smaller than a predetermined size, said setting means sets the first convey mode, and when the set original size exceeds the predetermined size, said setting means sets the second convey mode.

13. An apparatus according to claim 9, wherein said setting means sets the first or second convey mode on the basis of a mode signal from an image forming apparatus.

14. An apparatus according to claim 13, wherein said setting means sets the first convey mode on the basis of a single-side copy mode signal.

* * * * *

UNITED STATES PATENT AND TRADEMARK OFFICE
CERTIFICATE OF CORRECTION

PATENT NO. : 5,119,145
DATED : June 2, 1992
INVENTOR(S) : TAKESHI HONJO, ET AL.

It is certified that error appears in the above-identified patent and that said Letters Patent is hereby corrected as shown below:

IN THE DRAWINGS:

FIGURE 4A

"CLATCH" should read --CLUTCH--.

FIGURE 4B

"VELT" should read --BELT--.
"CLATCH" should read --CLUTCH--.

FIGURE 11A

"DISCHARCE" should read --DISCHARGE--.

FIGURE 17

"CLATCH" should read --CLUTCH-- (both occurrences).

COLUMN 4

Figure 16A:
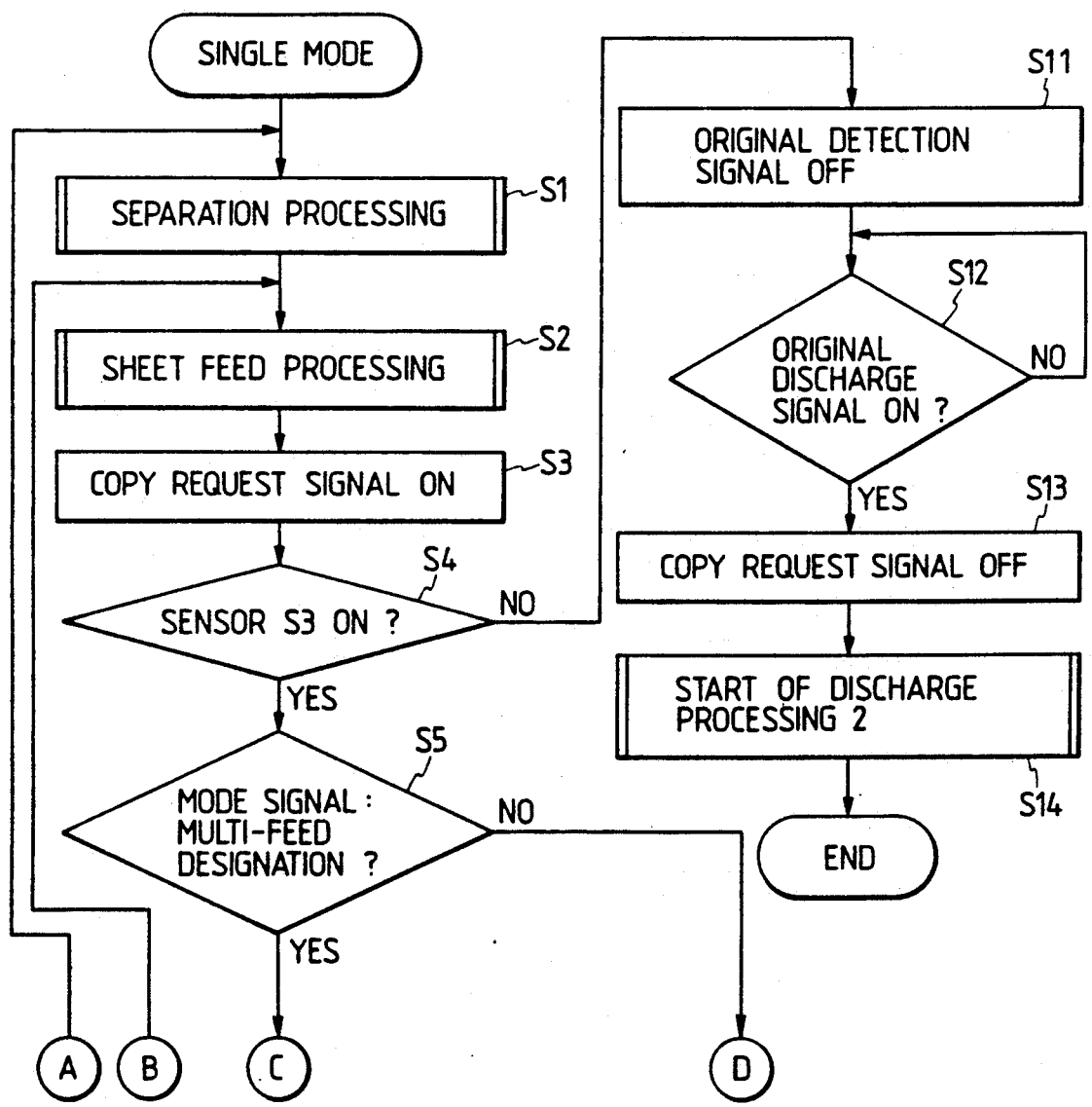
Figure 16B:
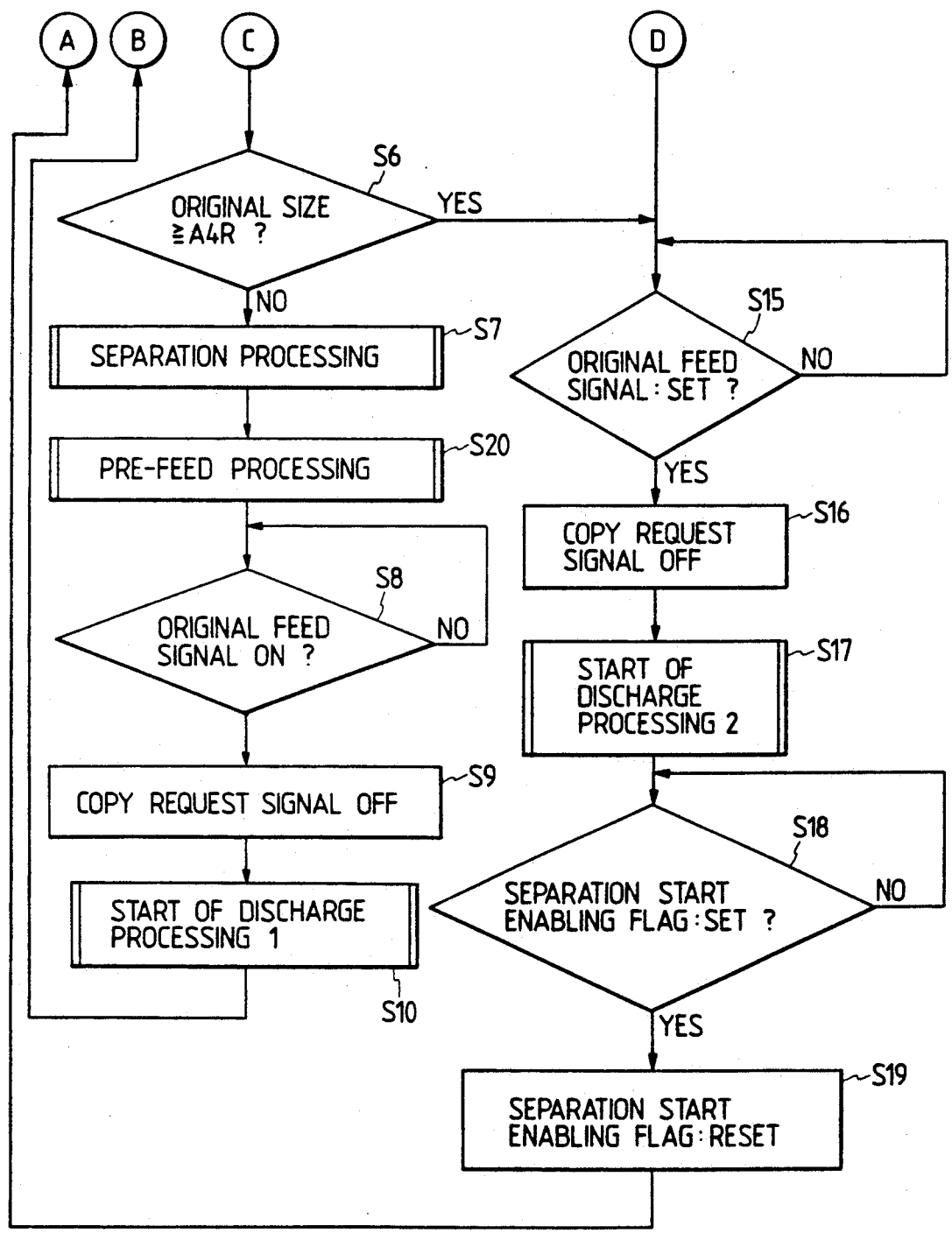

Line 47 and 48, should be deleted.
Line 58, "and" should read --FIG. 16, consisting of FIG. 16A and 16B, is a flow chart of the single mode operation; and--.

COLUMN 5

Line 9, "A" should read --A.--.

UNITED STATES PATENT AND TRADEMARK OFFICE
CERTIFICATE OF CORRECTION

PATENT NO. : 5,119,145
DATED : June 2, 1992
INVENTOR(S) : TAKESHI HONJO, ET AL.

It is certified that error appears in the above-indentified patent and that said Letters Patent is hereby corrected as shown below:

COLUMN 8

Line 3, "equal-magnification 612" should read --equal-magnification key 612--.
Line 68, "he" should read --the--.

COLUMN 9

Line 3, "controller 820 respectively" should read --controller 820, respectively,--.

COLUMN 10

Line 45, "FIG. 8," should read --FIGS. 8A and 8B,--.

COLUMN 12

Figure 10B:
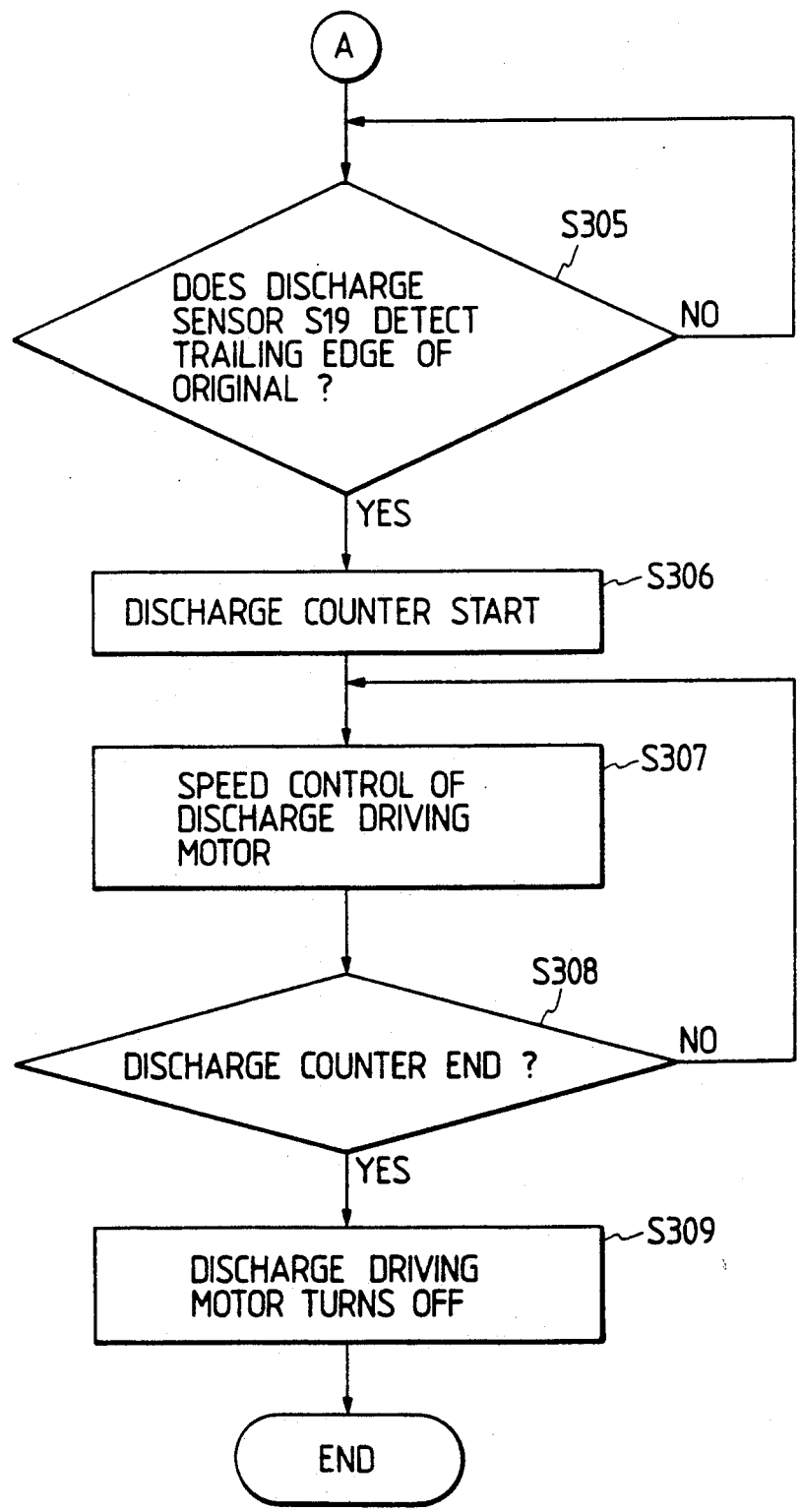
Figure 11B:
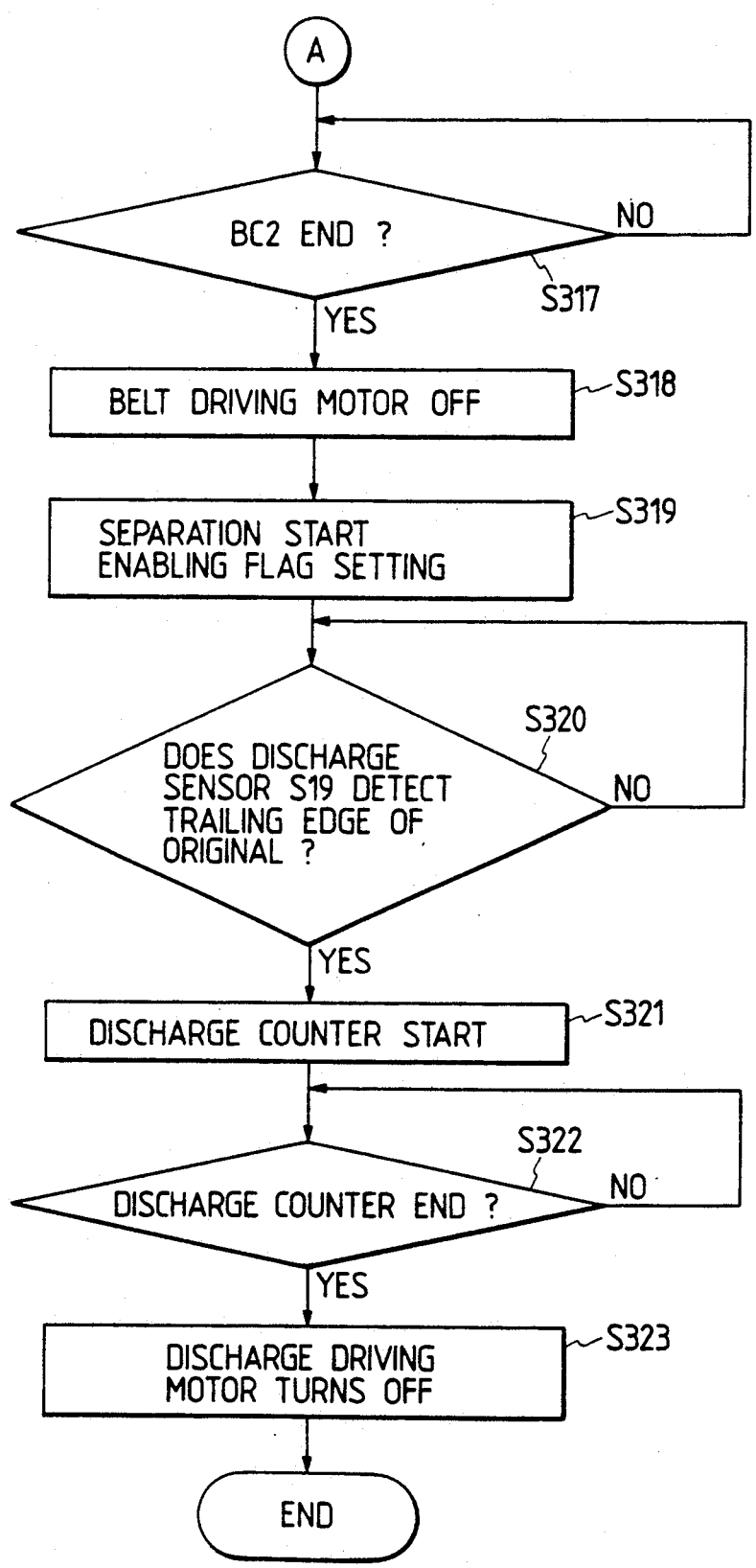
Figure 12:
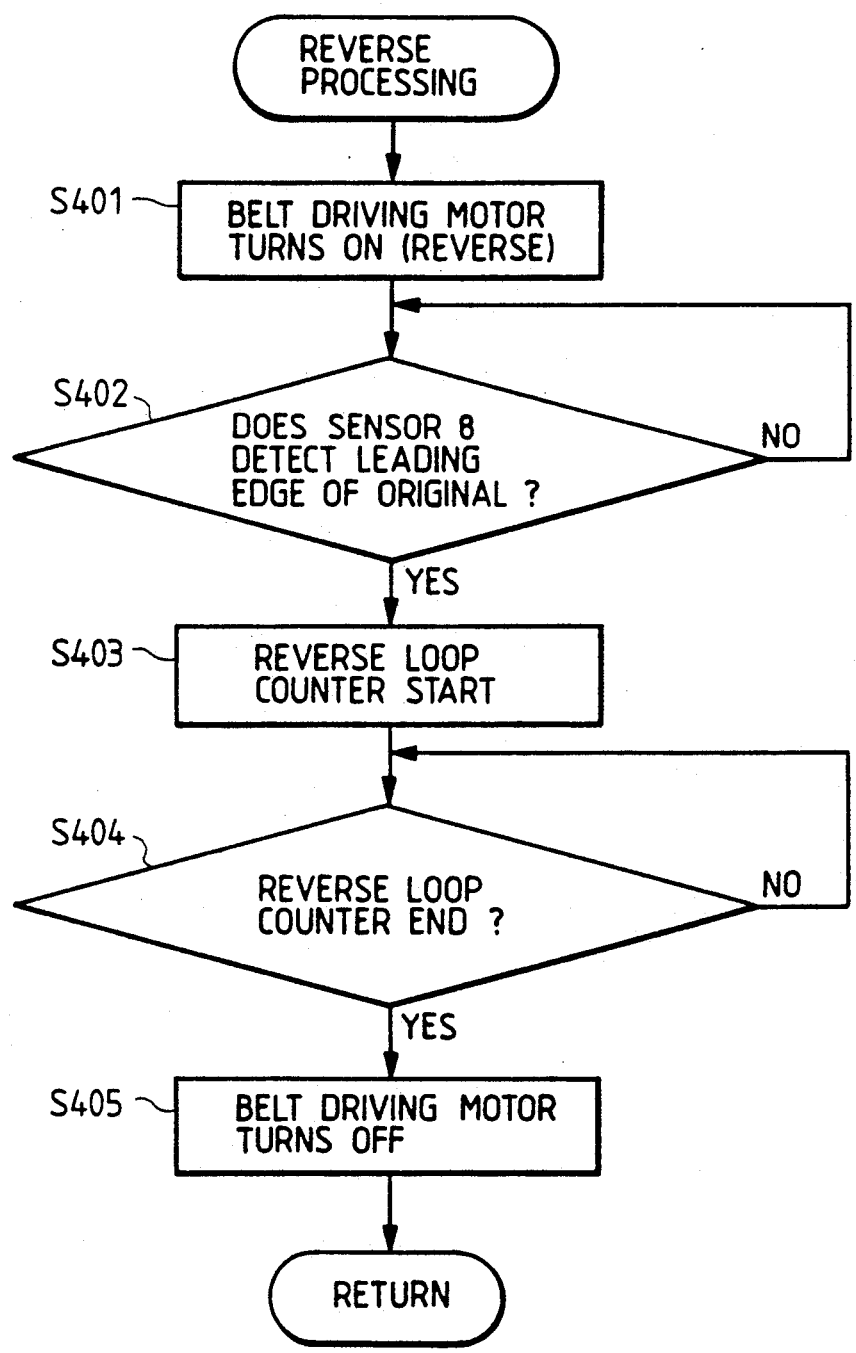

Line 1, "FIG. 10," should read --FIGS. 10A and 10B,--.
Line 4, "full-width belt 10" should read --full-width belt 11--.
Line 29, "full-width belt 10" should read --full-width belt 11--.
Line 67, "FIG. 11," should read --FIGS. 11A and 11B,--.

UNITED STATES PATENT AND TRADEMARK OFFICE
CERTIFICATE OF CORRECTION

PATENT NO. : 5,119,145

DATED : June 2, 1992

INVENTOR(S) : TAKESHI HONJO, ET AL.

It is certified that error appears in the above-indentified patent and that said Letters Patent is hereby corrected as shown below:

COLUMN 13

Line 40 "is waits" should read --is waited--.

COLUMN 14

Line 2, "(step S410)," should read --(step S401).--.
Line 47, "(step S67)," should read --(step S69).--.

COLUMN 15

Line 5, "is waited" should read --waits--.
Line 9, "FIG. 15" should read --FIGS. 15A and 15B--.
Line 35, "FIG. 16 shows" should read --FIGS. 16A and 16B show--.

Signed and Sealed this

Second Day of November, 1993

Attest:

BRUCE LEHMAN

Attesting Officer

Commissioner of Patents and Trademarks